(12) United States Patent
Yamaguchi et al.

(10) Patent No.: US 10,634,695 B2
(45) Date of Patent: Apr. 28, 2020

(54) FORCE SENSOR

(71) Applicants: Shinya Yamaguchi, Tokyo (JP);
Tomohito Taki, Tokyo (JP)

(72) Inventors: Shinya Yamaguchi, Tokyo (JP);
Tomohito Taki, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 15/958,373

(22) Filed: Apr. 20, 2018

(65) Prior Publication Data

US 2018/0313866 A1 Nov. 1, 2018

(30) Foreign Application Priority Data

Apr. 26, 2017 (JP) ................. 2017-086967
Mar. 29, 2018 (JP) ................. 2018-065655

(51) Int. Cl.

| G01P 15/12 | (2006.01) |
| G01P 15/18 | (2013.01) |
| G01L 5/162 | (2020.01) |
| G01L 5/22 | (2006.01) |
| G01L 1/22 | (2006.01) |
| G01L 1/18 | (2006.01) |
| G01P 15/08 | (2006.01) |

(52) U.S. Cl.
CPC ............. *G01P 15/123* (2013.01); *G01L 1/18* (2013.01); *G01L 1/2225* (2013.01); *G01L 1/2268* (2013.01); *G01L 1/2281* (2013.01); *G01L 5/162* (2013.01); *G01L 5/228* (2013.01); *G01P 15/18* (2013.01); *G01P 2015/084* (2013.01)

(58) Field of Classification Search
CPC ......... G01D 7/00; G01P 15/18; G01P 15/123; G01P 2015/084; G01L 1/18; G01L 1/2225; G01L 1/2268; G01L 1/2281; G01L 5/162; G01L 5/228
USPC ...................... 73/862.041–862.046
See application file for complete search history.

(56) References Cited

U.S. PATENT DOCUMENTS

| 4,849,730 | A | 7/1989 | Izumi et al. |
| 5,526,700 | A | 6/1996 | Akeel |
| 6,823,744 | B2 * | 11/2004 | Ohsato ................... G01L 5/162 73/862.041 |
| 7,594,445 | B2 * | 9/2009 | Hirabayashi ............ G01L 1/26 73/862.041 |
| 8,196,477 | B2 * | 6/2012 | Ohsato .................... G01L 1/26 73/766 |

(Continued)

FOREIGN PATENT DOCUMENTS

| EP | 1327870 | 7/2003 |
| JP | 2003-207405 | 7/2003 |
| WO | 2018066557 | 4/2018 |

OTHER PUBLICATIONS

Partial European search report for European Patent Application No. 18168812.8 dated Oct. 1, 2018.

*Primary Examiner* — Octavia Hollington
(74) *Attorney, Agent, or Firm* — IPUSA, PLLC

(57) ABSTRACT

A force sensor includes a sensor chip that detects displacements in multiple axial directions, and a strain body that transfers force applied thereto to the sensor chip. The strain body includes a sensor chip mount on which the sensor chip is mounted, multiple columns disposed around and apart from the sensor chip mount, and connecting beams via which the sensor chip mount is fixed to the columns.

12 Claims, 28 Drawing Sheets

(56) References Cited

U.S. PATENT DOCUMENTS

2003/0140713 A1    7/2003   Ohsato et al.

* cited by examiner

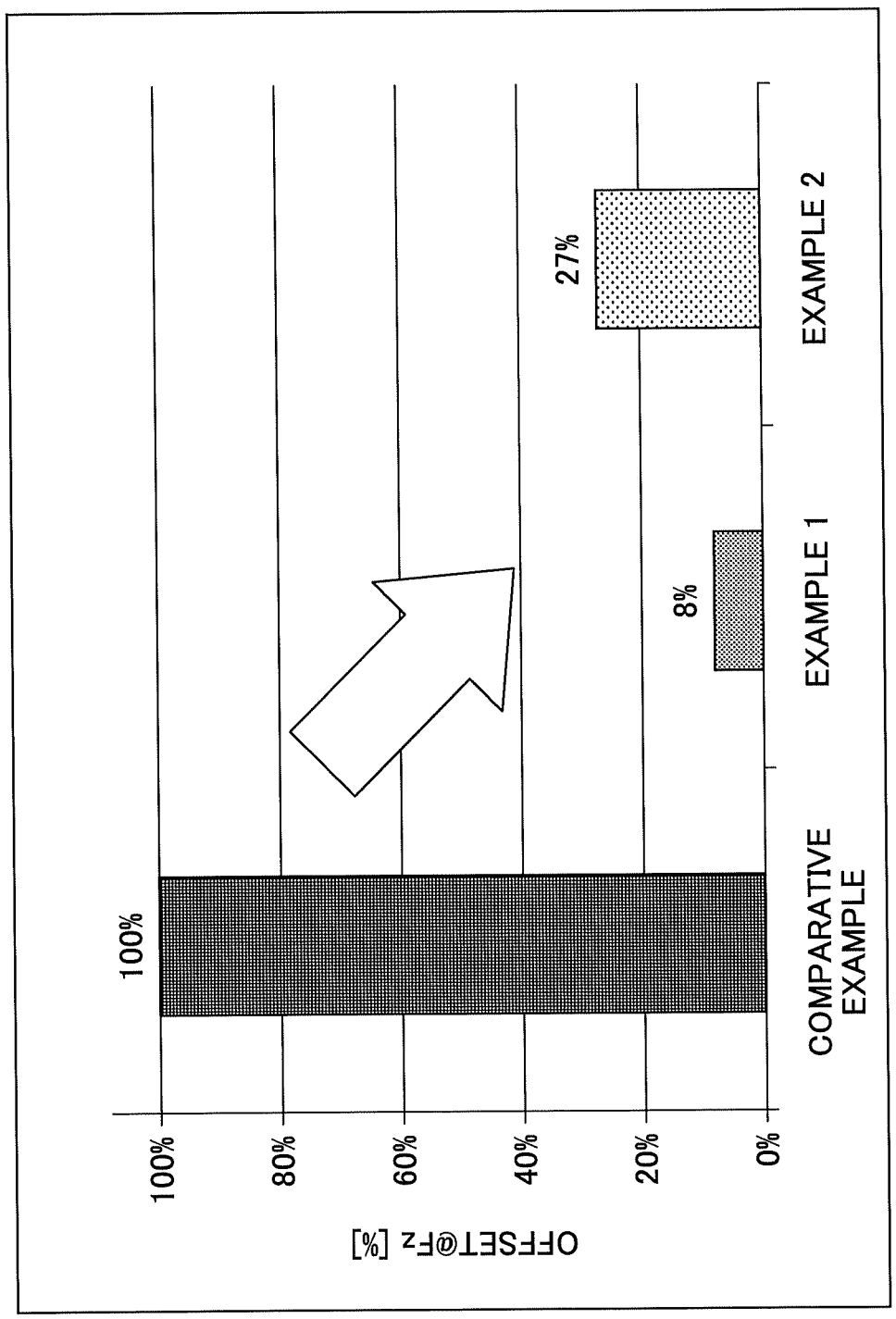

| OUTPUT AXIS | COMPARATIVE EXAMPLE | EXAMPLE 1 | EXAMPLE 2 |
|---|---|---|---|
| Fx(Fy) | 100% | 71% | 97% |
| Fz | 100% | 76% | 105% |
| (Mx)My | 100% | 100% | 115% |
| Mz | 100% | 60% | 96% |

FORCE SENSOR

CROSS-REFERENCE TO RELATED APPLICATIONS

The present application is based upon and claims the benefit of priority of Japanese Patent Application No. 2017-086967 filed on Apr. 26, 2017 and Japanese Patent Application No. 2018-065655 filed on Mar. 29, 2018, the entire contents of which are incorporated herein by reference.

BACKGROUND OF THE INVENTION

1. Field of the Invention

An aspect of this disclosure relates to a force sensor.

2. Description of the Related Art

A known force sensor includes a strain body made of a metal to which multiple strain gauges are bonded. The force sensor detects multiaxial force by converting a strain caused by an applied external force into an electric signal. However, because such a force sensor is manufactured by manually bonding strain gauges one by one to the strain body, there are problems in accuracy and productivity and it is structurally difficult to reduce the size.

Japanese Patent No. 4011345, for example, proposes a force sensor where strain gauges are replaced with a microelectromechanical system (MEMS) sensor chip for strain detection to solve a problem in bonding accuracy and to enable downsizing.

When a force sensor is used, the strain body may be attached to an object such as a housing by using, for example, screws. Depending on the configuration for fixing a sensor chip to the strain body, the strain body may be deformed due to a stress generated when the strain body is screwed to the object, and the deformation may be transferred to the sensor chip and cause a variation (or an offset) in the output of the sensor chip.

SUMMARY OF THE INVENTION

An aspect of this disclosure provides a force sensor including a sensor chip that detects displacements in multiple axial directions, and a strain body that transfers force applied thereto to the sensor chip. The strain body includes a sensor chip mount on which the sensor chip is mounted, multiple columns disposed around and apart from the sensor chip mount, and connecting beams via which the sensor chip mount is fixed to the columns.

BRIEF DESCRIPTION OF THE DRAWINGS

FIG. 19 is a graph illustrating simulation results of Fz outputs (offsets) of a sensor-chip in states of FIGS. 18B through 18D.

DESCRIPTION OF THE PREFERRED EMBODIMENTS

Embodiments of the present invention are described below with reference to the accompanying drawings. Throughout the accompanying drawings, the same reference numbers are used for the same components, and repeated descriptions of those components may be omitted.

First Embodiment

Figure 1A:
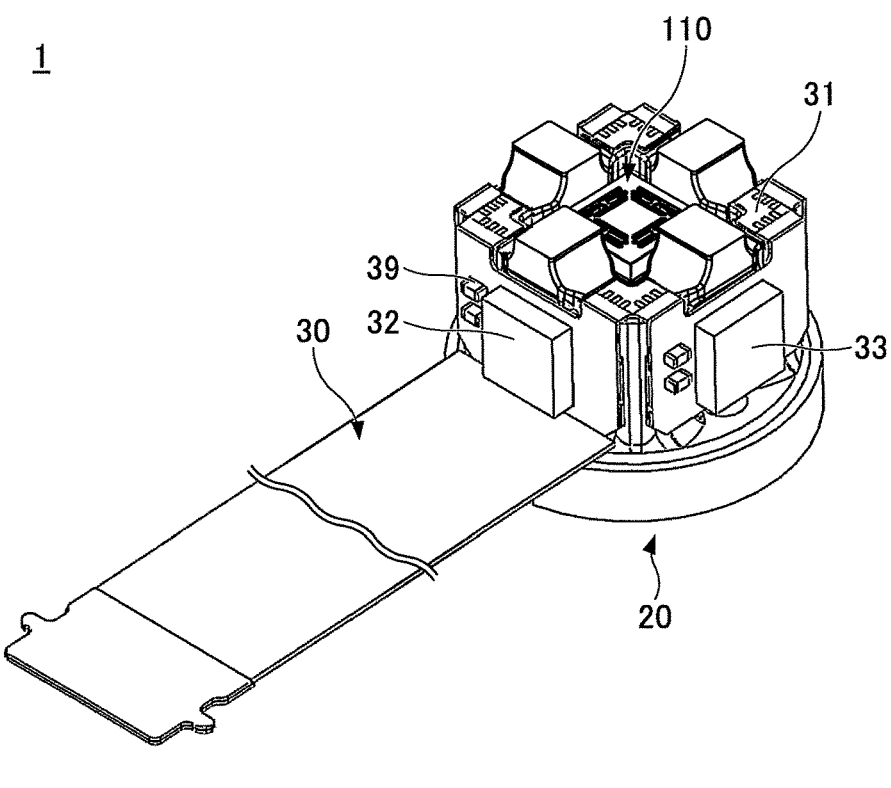
FIGS. 1A and 1B are perspective views of a force sensor according to a first embodiment.
Figure 1B:
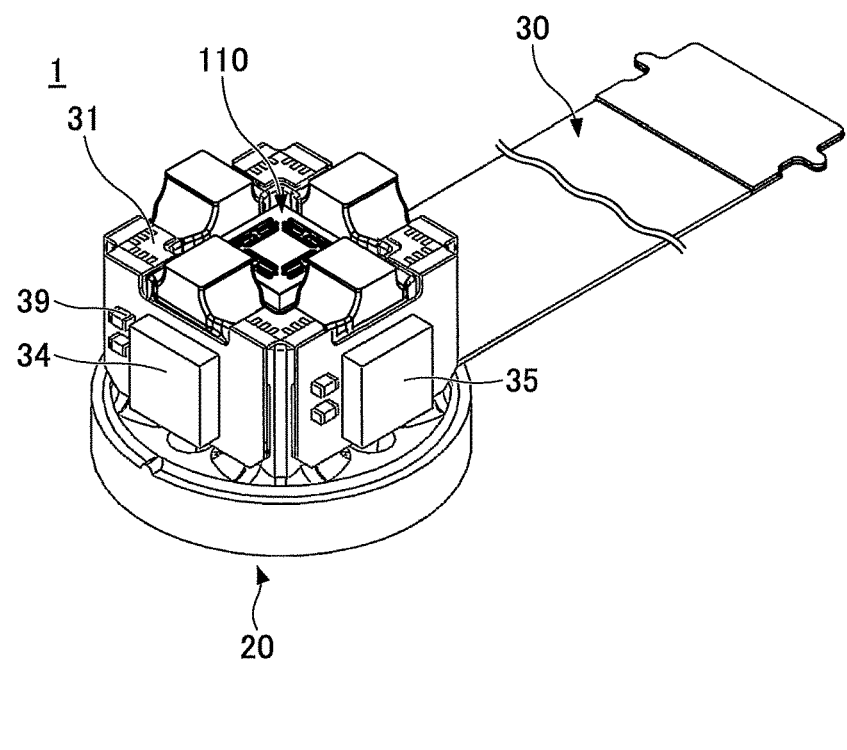
Figure 2:
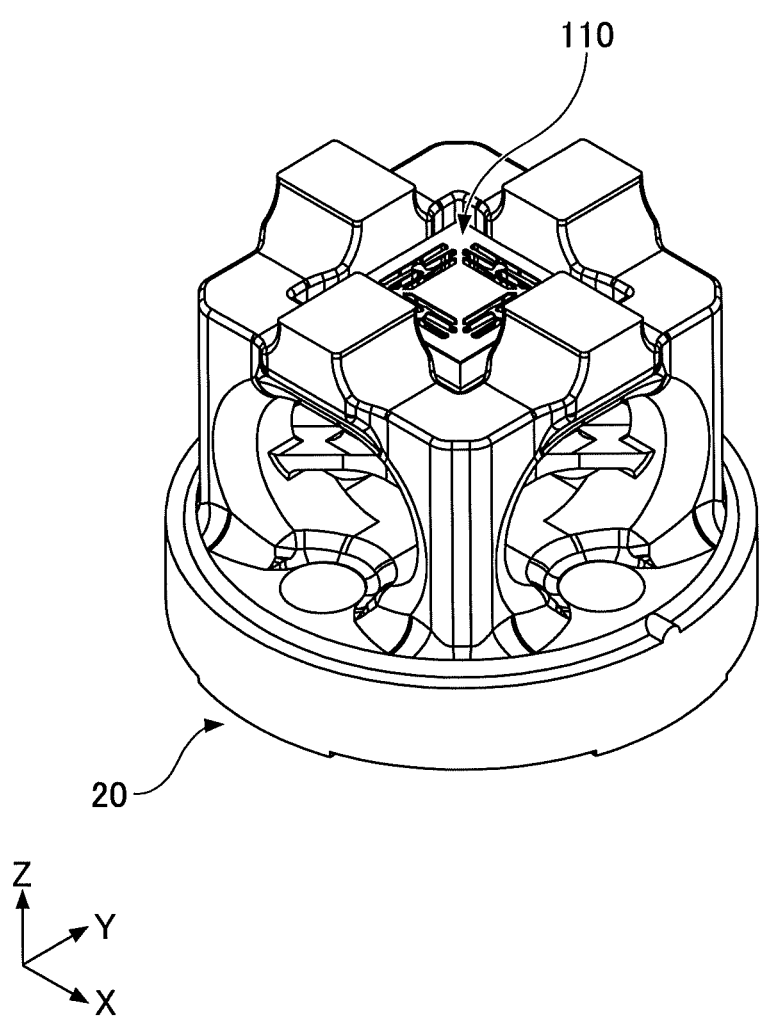
FIG. 2 is a perspective view of a sensor chip and a strain body of the force sensor according to the first embodiment.

<Configuration of Force Sensor>
FIGS. 1A and 1B are perspective views of a force sensor 1 according to a first embodiment. FIG. 2 is a perspective view of a sensor chip and a strain body of the force sensor 1 according to the first embodiment. As illustrated in FIGS. 1 and 2, the force sensor 1 includes a sensor chip 110, a strain body 20, and an input-output board 30. The force sensor 1 is a multiaxial force sensor that is, for example, mounted on an arm or a finger of a robot used for a machine tool.

The sensor chip 110 has a function to detect displacements in up to six axial directions. The strain body 20 has a function to transfer an applied force to the sensor chip 110.

The sensor chip 110 is bonded to an upper side of the strain body 20 so as not to protrude from the strain body 20. The input-output board 30 sends and receives signals to and from the sensor chip 110. One end of the input-output board 30, which may be bent as necessary, is bonded to an upper surface and side surfaces of the strain body 20. The sensor chip 110 and electrodes 31 of the input-output board 30 are electrically connected to each other via, for example, bonding wires (not shown).

An active component 32 and passive components 39 are mounted on an area of the input-output board 30 that is disposed in a first side surface of the strain body 20. An active component 33 and passive components 39 are mounted on an area of the input-output board 30 that is disposed on a second side surface of the strain body 20. An active component 34 and passive components 39 are mounted on an area of the input-output board 30 that is disposed on a third side surface of the strain body 20. An active component 35 and passive components 39 are mounted on an area of the input-output board 30 that is disposed on a fourth side surface of the strain body 20.

The active component 33 is, for example, an integrated circuit (IC) (AD converter) for converting, into digital signals, an analog signal from a bridge circuit that detects a force Fx in an X-axis direction output from the sensor chip 110 and an analog signal from a bridge circuit that detects a force Fy in a Y-axis direction output from the sensor chip 110.

The active component 34 is, for example, an IC (AD converter) for converting, into digital signals, an analog signal from a bridge circuit that detects a force Fz in a Z-axis direction output from the sensor chip 110 and an analog signal from a bridge circuit that detects a moment Mx around the X-axis output from the sensor chip 110.

The active component 35 is, for example, an IC (AD converter) for converting, into digital signals, an analog signal from a bridge circuit that detects a moment My around the Y-axis output from the sensor chip 110 and an analog signal from a bridge circuit that detects a moment Mz around the Z-axis output from the sensor chip 110.

The active component 32 is, for example, an IC that performs predetermined operations on the digital signals output from the active components 33, 34, and 35 to generate signals indicating the forces Fx, Fy, and Fz and the moments Mx, My, and Mz, and outputs the generates signals to the outside. The passive components 39 are, for example, resistors and capacitors connected to the active components 32 through 35.

The number of ICs for implementing the functions of the active components 32 through 35 may be freely determined. Also, instead of mounting the active components 32 through 35 on the input-output board 30, the active components 32 through 35 may be mounted on an external circuit connected to the input-output board 30. In this case, analog signals are output from the input-output board 30.

The input-output board 30 bends at the lower end of the first side surface of the strain body 20, and another end of the input-output board 30 extends outward. Terminals (not shown) for sending and receiving electric signals to and from an external circuit (e.g., controller) to be connected to the force sensor 1 are arranged near the other end of the input-output board 30.

In the present embodiment, for descriptive purposes, a side of the force sensor 1 where the sensor chip 110 is provided is referred to as an "upper side" or a "first side", and a side opposite the upper side is referred to as a "lower side" or a "second side". Also, a surface of each, component corresponding to the side where the sensor chip 110 is provided is referred to as an "upper surface" or a "first surface", and a surface opposite the upper surface is referred to as a "lower surface" or a "second surface". However, the force sensor 1 may be used in an upside-down position, and may be disposed at any angle. Further, a plan view indicates a view of an object seen from a direction of a normal line (Z-axis direction) of the upper surface of the sensor chip 110, and a planar shape indicates a shape of an object seen from the direction of the normal line (Z-axis direction) of the upper surface of the sensor chip 110.

<Sensor Chip>

Figure 3A:
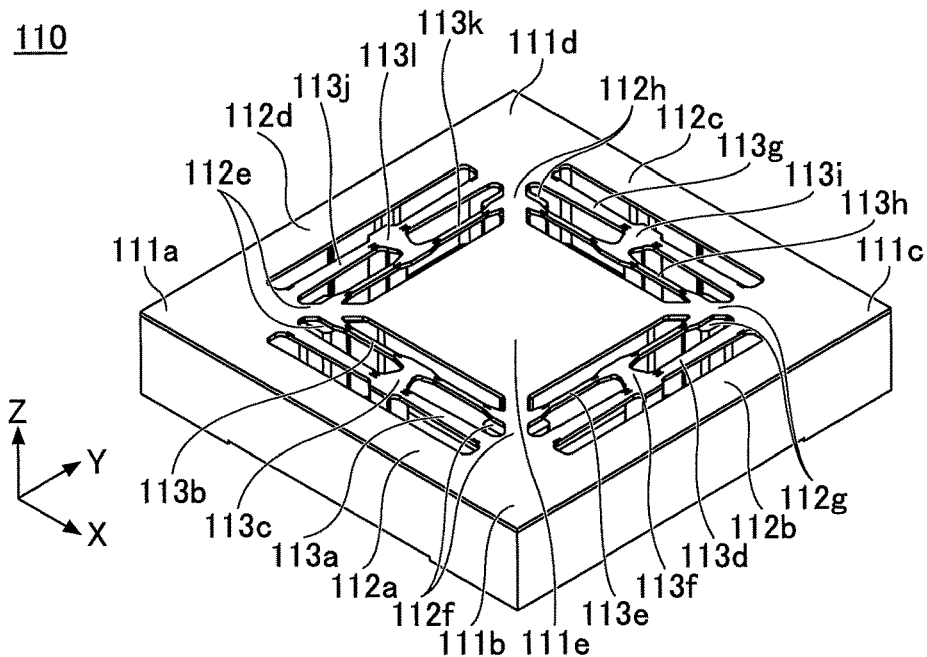
FIG. 3A is a top perspective view of a sensor chip.
Figure 3B:
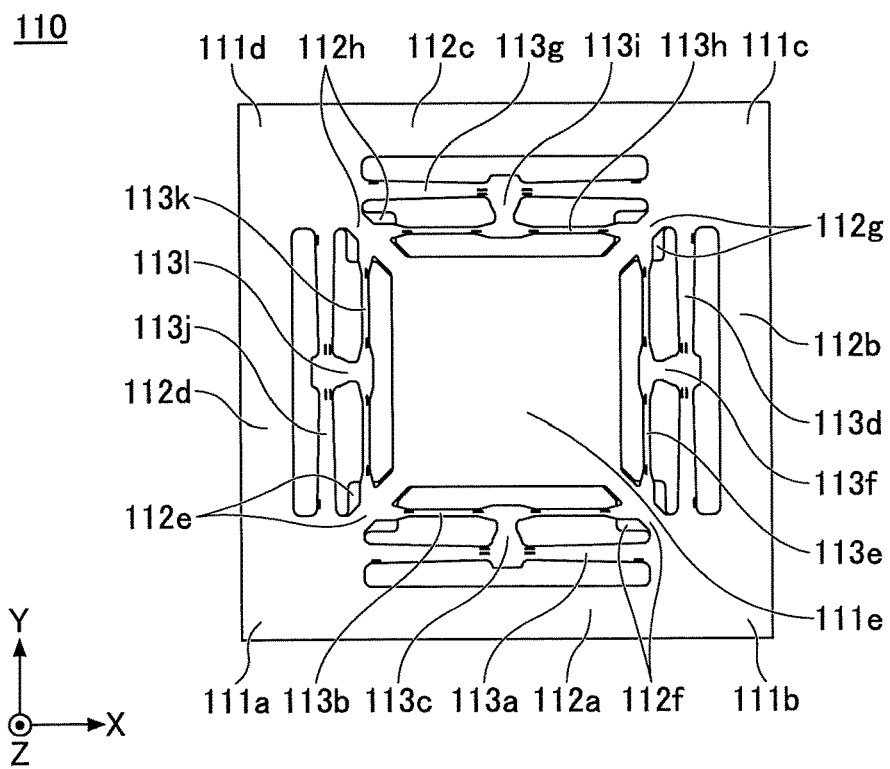
FIG. 3B is a top plan view of a sensor chip.
Figure 4A:
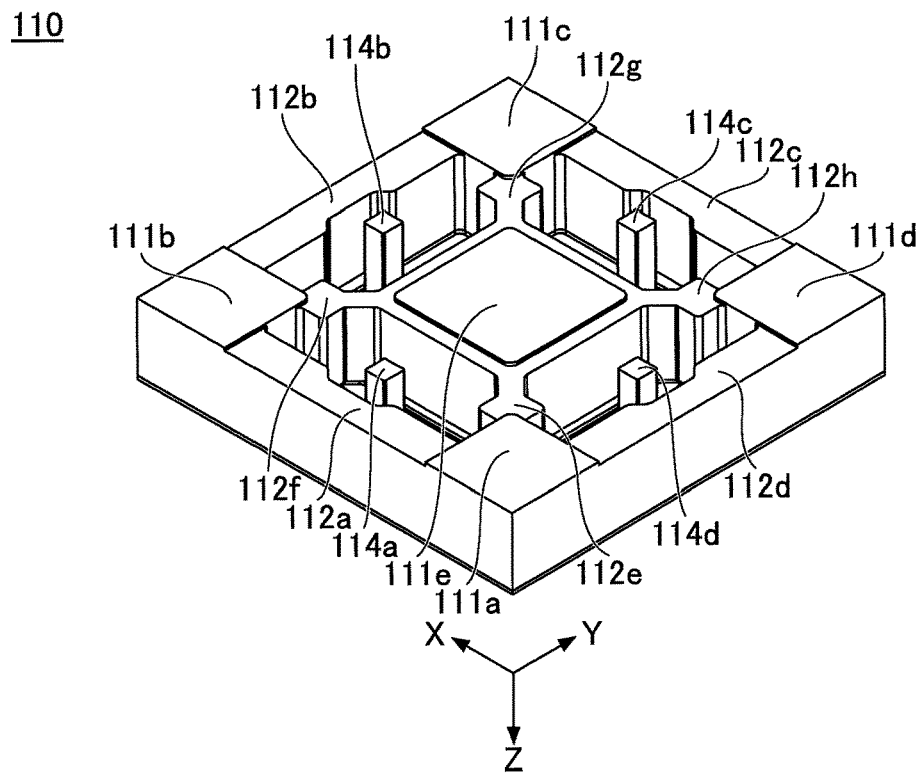
FIG. 4A is a bottom perspective view of a sensor chip.
Figure 4B:
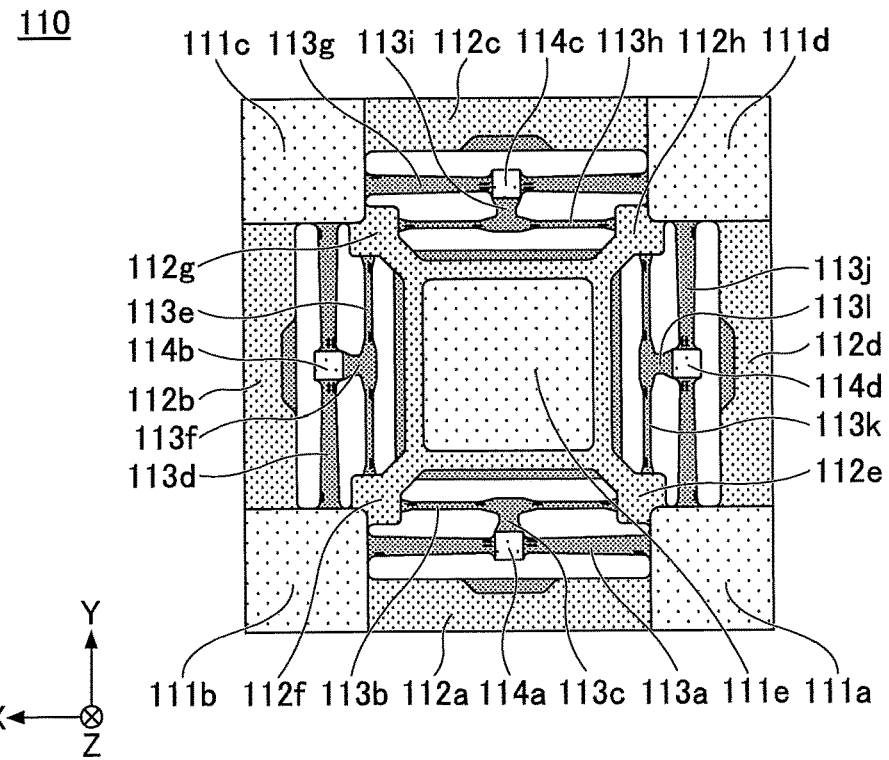
FIG. 4B is a bottom plan view of a sensor chip.

FIG. 3A is a perspective view and FIG. 3B is a plan view of the sensor chip 110 seen from the upper side in the Z-axis direction. FIG. 4A is a perspective view and FIG. 4B is a bottom view of the sensor chip 110 seen from the lower side in the Z-axis direction. In FIG. 4B, surfaces at the same height are indicated by the same hatching. The X-axis direction is a direction that is parallel to a side of the upper surface of the sensor chip 110, the Y-axis direction is a direction that is perpendicular to the side of the upper surface of the sensor chip 110, and the Z-axis direction is a direction that is parallel to the direction of thickness of the sensor chip 110 (the direction of the normal line on the upper surface of the sensor chip 110). The X-axis direction, the Y-axis direction, and the Z-axis direction are orthogonal to each other.

The sensor chip 110 illustrated in FIGS. 3A through 4B is a microelectromechanical system (MEMS) sensor chip that can detect up to six axial forces/moments, and is formed of a semiconductor substrate such as a silicon on insulator (SOI) substrate. The sensor chip 110 may have a square planar shape that is about 3000 µm square.

The sensor chip 110 includes five columnar supports 111a through 111e. Each of the supports 111a through 111e may have a square planar shape that is about 500 µm square. The supports 111a through 111d, which may be referred to as "first supports", are disposed at four corners of the sensor chip 110. The support 111e, which may be referred to as a "second support", is disposed in the middle of the supports 111a through 111d.

Each of the supports 111a through 111e may be formed of an active layer, a BOX layer, and a support layer of the SOI substrate, and may have a thickness of about 500 µm.

A reinforcing beam 112a for structural reinforcement is provided between the support 111a and the support 111b. The ends of the reinforcing beam 112a are fixed to the support 111a and the support 111b (so as to connect the adjacent supports to each other). A reinforcing beam 112b for structural reinforcement is provided between the support 111b and the support 111c. The ends of the reinforcing beam 112b are fixed to the support 111b and the support 111c (so as to connect the adjacent supports to each other).

A reinforcing beam 112c for structural reinforcement is provided between the support 111c and the support 111d. The ends of the reinforcing beam 112c are fixed to the support 111c and the support 111d (so as to connect the adjacent supports to each other). A reinforcing beam 112d for structural reinforcement is provided between the support 111*d* and the support 111*a*. The ends of the reinforcing beam 112*d* are fixed to the support 111*d* and the support 111*a* (so as to connect the adjacent supports to each other).

In other words, the four reinforcing beams 112*a*, 112*b*, 112*c*, and 112*d*, which may be referred to as "first reinforcing beams", form a frame, and the supports 111*b*, 111*c*, 111*d*, and 111*a* are provided at corners of the frame where the reinforcing beams 112*a*, 112*b*, 112*c*, and 112*d* intersect with each other.

An inner corner of the support 111*a* and a corner of the support 111*e* facing the inner corner of the support 111*a* are connected to each other via a reinforcing beam 112*e* for structural reinforcement. An inner corner of the support 111*b* and a corner of the support 111*e* facing the inner corner of the support 111*b* are connected to each other via a reinforcing beam 112*f* for structural reinforcement.

An inner corner of the support 111*c* and a corner of the support 111*e* facing the inner corner of the support 111*c* are connected to each other via a reinforcing beam 112*g* for structural reinforcement. An inner corner of the support 111*d* and a corner of the support 111*e* facing the inner corner of the support 111*d* are connected to each other via a reinforcing beam 112*h* for structural reinforcement. The reinforcing beams 112*e* through 112*h*, which may be referred to as "second reinforcing beams", are inclined with respect to the X-axis direction (or the Y-axis direction). That is, the reinforcing beams 112*e* through 112*h* are not parallel to the reinforcing beams 112*a* through 112*d*.

Each of the reinforcing beams 112*a* through 112*h* may be formed of the active layer, the BOX layer, and the support layer of the SOI substrate. Each of the reinforcing beams 112*a* through 112*h* may have a width (in the short direction) of, for example, about 140 μm. The upper surfaces of the reinforcing beams 112*a* through 112*h* and the upper surfaces of the supports 111*a* through 111*e* are substantially in the same plane.

In contrast, the lower surfaces of the reinforcing beams 112*a* through 112*h* are positioned higher than the lower surfaces of the supports 111*a* through 111*e* and the lower surfaces of force points 114*a* through 114*d* by about 10 μm. This is to prevent the lower surfaces of the reinforcing beams 112*a* through 112*h* from contacting the corresponding surfaces of the strain body 20 when the sensor chip 110 is bonded to the strain body 20.

Providing reinforcing beams, which are thicker and more rigid than detection beams for detecting strains, separately from the detection beams makes it possible to increase the rigidity of the entire sensor chip 110. This in turn reduces deformation of components other than detection beams and makes it possible to achieve excellent sensor characteristics.

A detection beam 113*a* for detecting a strain is provided inside of the reinforcing beam 112*a* between the support 111*a* and the support 111*b*. The detection beam 113*a* is disposed at a distance from and parallel to the reinforcing beam 112*a*, and the ends of the detection beam 113*a* are fixed to the support 111*a* and the support 111*b* (so as to connect the adjacent supports to each other).

A detection beam 113*b* is provided between the detection beam 113*a* and the support 111*e*. The detection beam 113*b* is disposed at a distance from the detection beam 113*a* and the support 111*e* and disposed parallel to the detection beam 113*a*. The detection beam 113*b* connects an end of the reinforcing beam 112*e* closer to the support 111*e* to an end of the reinforcing beam 112*f* closer to the support 111*e*.

A substantially-middle portion of the detection beam 113*a* in the longitudinal direction and a substantially-middle portion of the detection beam 113*b* in the longitudinal direction are connected to each other via a detection beam 113*c* disposed orthogonal to the detection beam 113*a* and the detection beam 113*b*.

A detection beam 113*d* for detecting a strain is provided inside of the reinforcing beam 112*b* between the support 111*b* and the support 111*c*. The detection beam 113*d* is disposed at a distance from and parallel to the reinforcing beam 112*b*, and the ends of the detection beam 113*d* are fixed to the support 111*b* and the support 111*c* (so as to connect the adjacent supports to each other).

A detection beam 113*e* is provided between the detection beam 113*d* and the support 111*e*. The detection beam 113*e* is disposed at a distance from the detection beam 113*d* and the support 111*e* and disposed parallel to the detection beam 113*d*. The detection beam 113*e* connects an end of the reinforcing beam 112*f* closer to the support 111*e* to an end of the reinforcing beam 112*g* closer to the support 111*e*.

A substantially-middle portion of the detection beam 113*d* in the longitudinal direction and a substantially-middle portion of the detection beam 113*e* in the longitudinal direction are connected to each other via a detection beam 113*f* disposed orthogonal to the detection beam 113*d* and the detection beam 113*e*.

A detection beam 113*g* for detecting a strain is provided inside of the reinforcing beam 112*c* between the support 111*c* and the support 111*d*. The detection beam 113*g* is disposed at a distance from and parallel to the reinforcing beam 112*c*, and the ends of the detection beam 113*g* are fixed to the support 111*c* and the support 111*d* (so as to connect the adjacent supports to each other).

A detection beam 113*h* is provided between the detection beam 113*g* and the support 111*e*. The detection beam 113*h* is disposed at a distance from the detection beam 113*g* and the support 111*e* and disposed parallel to the detection beam 113*g*. The detection beam 113*h* connects an end of the reinforcing beam 112*g* closer to the support 111*e* to an end of the reinforcing beam 112*h* closer to the support 111*e*.

A substantially-middle portion of the detection beam 113*g* in the longitudinal direction and a substantially-middle portion of the detection beam 113*h* in the longitudinal direction are connected to each other via a detection beam 113*i* disposed orthogonal to the detection beam 113*g* and the detection beam 113*h*.

A detection beam 113*j* for detecting a strain is provided inside of the reinforcing beam 112*d* between the support 111*d* and the support 111*a*. The detection beam 113*j* is disposed at a distance from and parallel to the reinforcing beam 112*d*, and the ends of the detection beam 113*j* are fixed to the support 111*d* and the support 111*a* (so as to connect the adjacent supports to each other).

A detection beam 113*k* is provided between the detection beam 113*j* and the support 111*e*. The detection beam 113*k* is disposed at a distance from the detection beam 113*j* and the support 111*e* and disposed parallel to the detection beam 113*j*. The detection beam 113*k* connects an end of the reinforcing beam 112*h* closer to the support 111*e* to an end of the reinforcing beam 112*e* closer to the support 111*e*.

A substantially-middle portion of the detection beam 113*j* in the longitudinal direction and a substantially-middle portion of the detection beam 113*k* in the longitudinal direction are connected to each other via a detection beam 113*l* disposed orthogonal to the detection beam 113*j* and the detection beam 113*k*.

The detection beams 113*a* through 113*l* are provided at the upper-end side in the thickness direction of the supports 111*a* through 111*e*, and may be formed of, for example, the active layer of the SOI substrate. Each of the detection beams 113a through 113l may have a width (in the short direction) of, for example, about 75 μm. The upper surfaces of the detection beams 113a through 113l and the upper surfaces of the supports 111a through 111e are substantially in the same plane. Each of the detection beams 113a through 113l may have a thickness of, for example, about 50 μm.

A force point 114a is provided on the lower side of the middle portion of the detection beam 113a in the longitudinal direction (i.e., at the intersection between the detection beam 113a and the detection beam 113c). The detection beams 113a, 113b, and 113c and the force point 114a form one detection block.

A force point 114b is provided on the lower side of the middle portion of the detection beam 113d in the longitudinal direction (i.e., at the intersection between the detection beam 113d and the detection beam 113f). The detection beams 113d, 113e, and 113f and the force point 114b form one detection block.

A force point 114c is provided on the lower side of the middle portion of the detection beam 113g in the longitudinal direction (i.e., at the intersection between the detection beam 113g and the detection beam 113i). The detection beams 113g, 113h, and 113i and the force point 114c form one detection block.

A force point 114d is provided on the lower side of the middle portion of the detection beam 113j in the longitudinal direction (i.e., at the intersection between the detection beam 113j and the detection beam 113l). The detection beams 113j, 113k, and 113l and the force point 114d form one detection block.

Each of the force points 114a through 114d receives an applied external force and may be formed of, for example, the BOX layer and the support layer of the SOI substrate. The lower surfaces of the force points 114a through 114d and the lower surfaces of the supports 111a through 111e are substantially in the same plane.

Thus, the force sensor 1 is configured such that forces or displacements are received at the four force points 114a through 114d and different beams are deformed depending on the types of forces. This in turn makes it possible to implement a sensor that can accurately distinguish six axial forces/moments.

In the sensor chip 110, parts forming inside corners are preferably rounded to suppress stress concentration.

Figure 5:
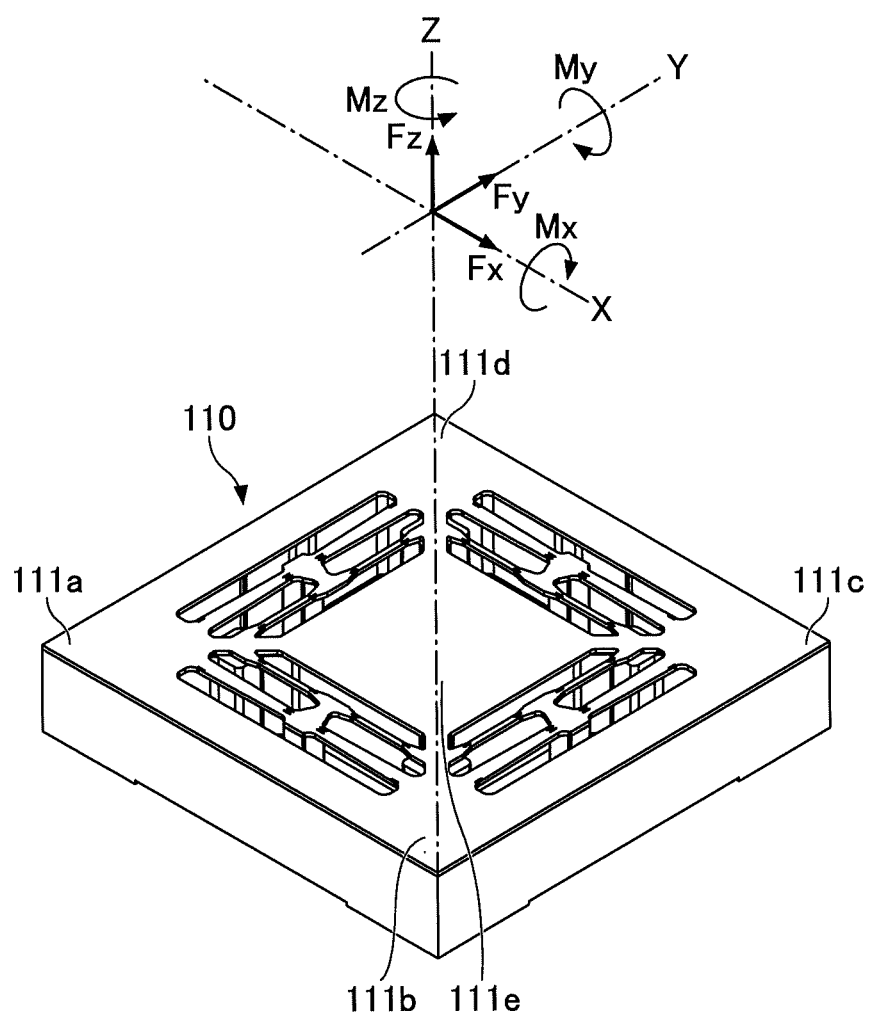
FIG. 5 is a drawing illustrating axial forces and moments.

FIG. 5 is a drawing illustrating axial forces and moments. As illustrated in FIG. 5, Fx indicates a force in the X-axis direction, Fy indicates a force in the Y-axis direction, and Fz indicates a force in the Z-axis direction. Also, Mx indicates a moment around the X-axis, My indicates a moment around the Y-axis, and Mz indicates a moment around the Z-axis.

Figure 6:
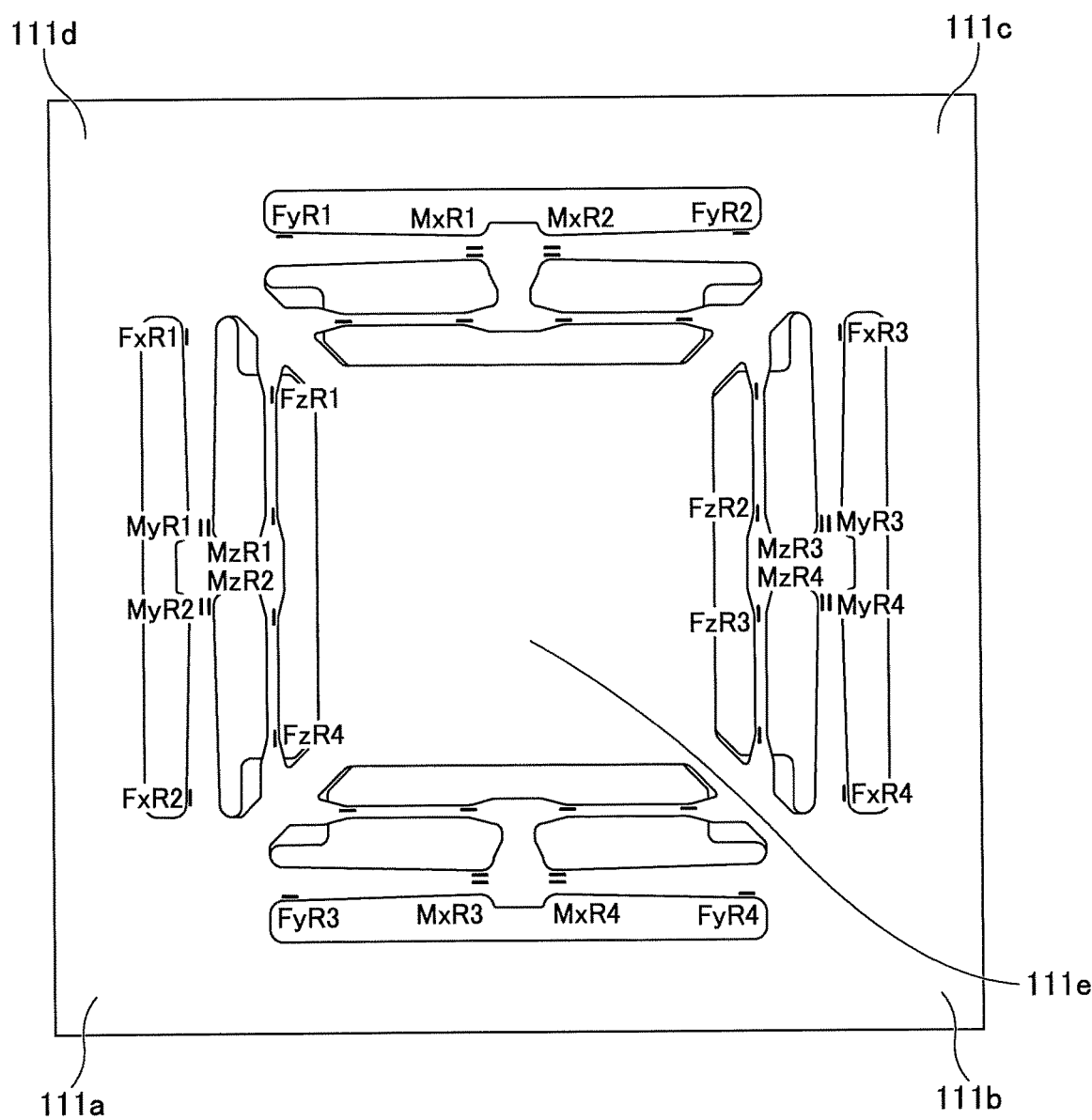
FIG. 6 is a drawing illustrating an arrangement of piezoresistors in a sensor chip.

FIG. 6 is a drawing illustrating an arrangement of piezoresistors in the sensor chip 110. Piezoresistors are arranged in predetermined positions in each of the detection blocks corresponding to the four force points 114a through 114d.

Referring to FIGS. 3A and 3B and FIG. 6, in the detection block corresponding to the force point 114a, piezoresistors MxR3 and MxR4 are disposed in positions that are on a line bisecting the detection beam 113a in the longitudinal direction, are symmetrical with respect to a line bisecting the detection beam 113c in the longitudinal direction (Y direction), and are in an area of the detection beam 113a that is close to the detection beam 113c. Piezoresistors FyR3 and FyR4 are disposed in areas of the detection beam 113a that are closer to the reinforcing beam 112a than a line bisecting the detection beam 113a in the longitudinal direction and are away from the detection beam 113c. The piezoresistors FyR3 and FyR4 are disposed in positions that are symmetrical with respect to a line bisecting the detection beam 113c in the longitudinal direction.

In the detection block corresponding to the force point 114b, piezoresistors MyR3 and MyR4 are disposed in positions that are on a line bisecting the detection beam 113d in the longitudinal direction, are symmetrical with respect to a line bisecting the detection beam 113f in the longitudinal direction (Y direction), and are in an area of the detection beam 113d that is close to the detection beam 113f. Piezoresistors FxR3 and FxR4 are disposed in areas of the detection beam 113d that are closer to the reinforcing beam 112b than a line bisecting the detection beam 113d in the longitudinal direction and are away from the detection beam 113f. The piezoresistors FxR3 and FxR4 are disposed in positions that are symmetrical with respect to a line bisecting the detection beam 113f in the longitudinal direction.

Piezoresistors MzR3 and MzR4 are disposed in an area of the detection beam 113d that is closer to the detection beam 113f than a line bisecting the detection beam 113d in the longitudinal direction and is close to the detection beam 113f. The piezoresistors MzR3 and MzR4 are disposed in positions that are symmetrical with respect to a line bisecting the detection beam 113f in the longitudinal direction. Piezoresistors FzR2 and FzR3 are disposed in an area of the detection beam 113e that is closer to the support 111e than a line bisecting the detection beam 113e in the longitudinal direction and is close to the detection beam 113f. The piezoresistors FzR2 and FzR3 are disposed in positions that are symmetrical with respect to a line bisecting the detection beam 113f in the longitudinal direction.

In the detection block corresponding to the force point 114c, piezoresistors MxR1 and MxR2 are disposed in positions that are on a line bisecting the detection beam 113g in the longitudinal direction, are symmetrical with respect to a line bisecting the detection beam 113i in the longitudinal direction (Y direction), and are in an area of the detection beam 113g that is close to the detection beam 113i. Piezoresistors FyR1 and FyR2 are disposed in areas of the detection beam 113g that are closer to the reinforcing beam 112c than a line bisecting the detection beam 113g in the longitudinal direction and are away from the detection beam 113i. The piezoresistors FyR1 and FyR2 are disposed in positions that are symmetrical with respect to a line bisecting the detection beam 113i in the longitudinal direction.

In the detection block corresponding to the force point 114d, piezoresistors MyR1 and MyR2 are disposed in positions that are on a line bisecting the detection beam 113j in the longitudinal direction, are symmetrical with respect to a line bisecting the detection beam 113l in the longitudinal direction (X direction), and are in an area of the detection beam 113j that is close to the detection beam 113l. Piezoresistors FxR1 and FxR2 are disposed in areas of the detection beam 113j that are closer to the reinforcing beam 112d than a line bisecting the detection beam 113j in the longitudinal direction and are away from the detection beam 113l. The piezoresistors FxR1 and FxR2 are disposed in positions that are symmetrical with respect to a line bisecting the detection beam 113l in the longitudinal direction.

Piezoresistors MzR1 and MzR2 are disposed in an area of the detection beam 113j that is closer to the detection beam 113k than a line bisecting the detection beam 113j in the longitudinal direction and is close to the detection beam 113l. The piezoresistors MzR1 and MzR2 are disposed in positions that are symmetrical with respect to a line bisecting the detection beam 113l in the longitudinal direction. Piezoresistors FzR1 and FzR4 are disposed in areas of the detection beam 113k that are closer to the support 111e than a line bisecting the detection beam 113k in the longitudinal direction and are away from the detection beam 113l. The piezoresistors FzR1 and FzR4 are disposed in positions that are symmetrical with respect to a line bisecting the detection beam 113l in the longitudinal direction.

Thus, in the sensor chip 110, multiple piezoresistors are grouped and disposed in respective detection blocks. This configuration makes it possible to detect displacements in up to six axial directions based on changes in outputs of piezoresistors disposed on the corresponding beams. The changes in outputs of piezoresistors correspond to directions (axial directions) of forces applied (or transferred) to the force points 114a through 114d.

In the sensor chip 110, the detection beams 113c, 113f, 113i, and 113l are made as short as possible so that the detection beams 113b, 113e, 113h, and 113k can be disposed close to the detection beams 113a, 113d, 113g, and 113j and can have sufficient length. This configuration enables the detection beams 113b, 113e, 113h, and 113k to readily curve, and thereby makes it possible to reduce stress concentration and increase the load capacity.

Also, in the sensor chip 110, no piezoresistor is provided on the detection beams 113c, 113f, 113i, and 113l that are made short and do not deform greatly in response to stress. Instead, piezoresistors are disposed near maximum stress positions on the detection beams 113a, 113d, 113g, 113j, 113b, 113e, 113h, and 113k that are narrower and longer than the detection beams 113c, 113f, 113i, and 113l and can readily warp. This configuration enables the sensor chip 110 to efficiently receive stress and improve the sensitivity (the degree of change in the resistance of piezoresistors in response to the same stress) of the sensor chip 110.

The sensor chip 110 also includes dummy piezoresistors in addition to the piezoresistors used to detect strains. The dummy piezoresistors are arranged such that all the piezoresistors including the piezoresistors used for strain detection and the dummy piezoresistors become point-symmetric with respect to the center of the support 111e.

The piezoresistors FxR1 through FxR4 detect the force Fx, the piezoresistors FyR1 through FyR4 detect the force Fy, and the piezoresistors FzR1 through FzR4 detect the force Fz. The piezoresistors MxR1 through MxR4 detect the moment Mx, the piezoresistors MyR1 through MyR4 detect the moment My, and the piezoresistors MzR1 through MzR4 detect the moment Mz.

In the sensor chip 110, multiple piezoresistors are grouped and disposed in the respective detection blocks. This configuration makes it possible to detect displacements in up to six axial directions based on changes in outputs of piezoresistors disposed on the corresponding beams. The changes in outputs of piezoresistors correspond to directions (axial directions) of displacements or forces applied (or transferred) to the force points 114a through 114d.

In the sensor chip 110, displacements in the Z-axis direction (Mx, My, and Fz) can be detected based on deformation of predetermined detection beams. That is, the moments in the X-axis direction and the Y-axis direction (Mx and My) are detected based on deformation of the detection beams 113a, 113d, 113g, and 113j, which are first detection beams. The force in the Z-axis direction (Fz) is detected based on deformation of the detection beams 113e and 113k, which are second detection beams.

Also, in the sensor chip 110, displacements in the X-axis direction and the Y-axis direction (Fx, Fy, and Mz) can be detected based on deformation of predetermined detection beams. That is, the forces in the X-axis direction and the Y-axis direction (Fx and Fy) are detected based on deformation of the detection beams 113a, 113d, 113g, and 113j, which are first detection beams. The moment in the Z-axis direction (Mz) is detected based on deformation of the detection beams 113d and 113j, which are first detection beams.

The detection sensitivities can be made uniform and improved by adjusting the thickness and the width of the detection beams.

Also, the sensor chip 110 may be configured to detect displacements in less than or equal to five axial directions by reducing the number of piezoresistors.

Figure 7:
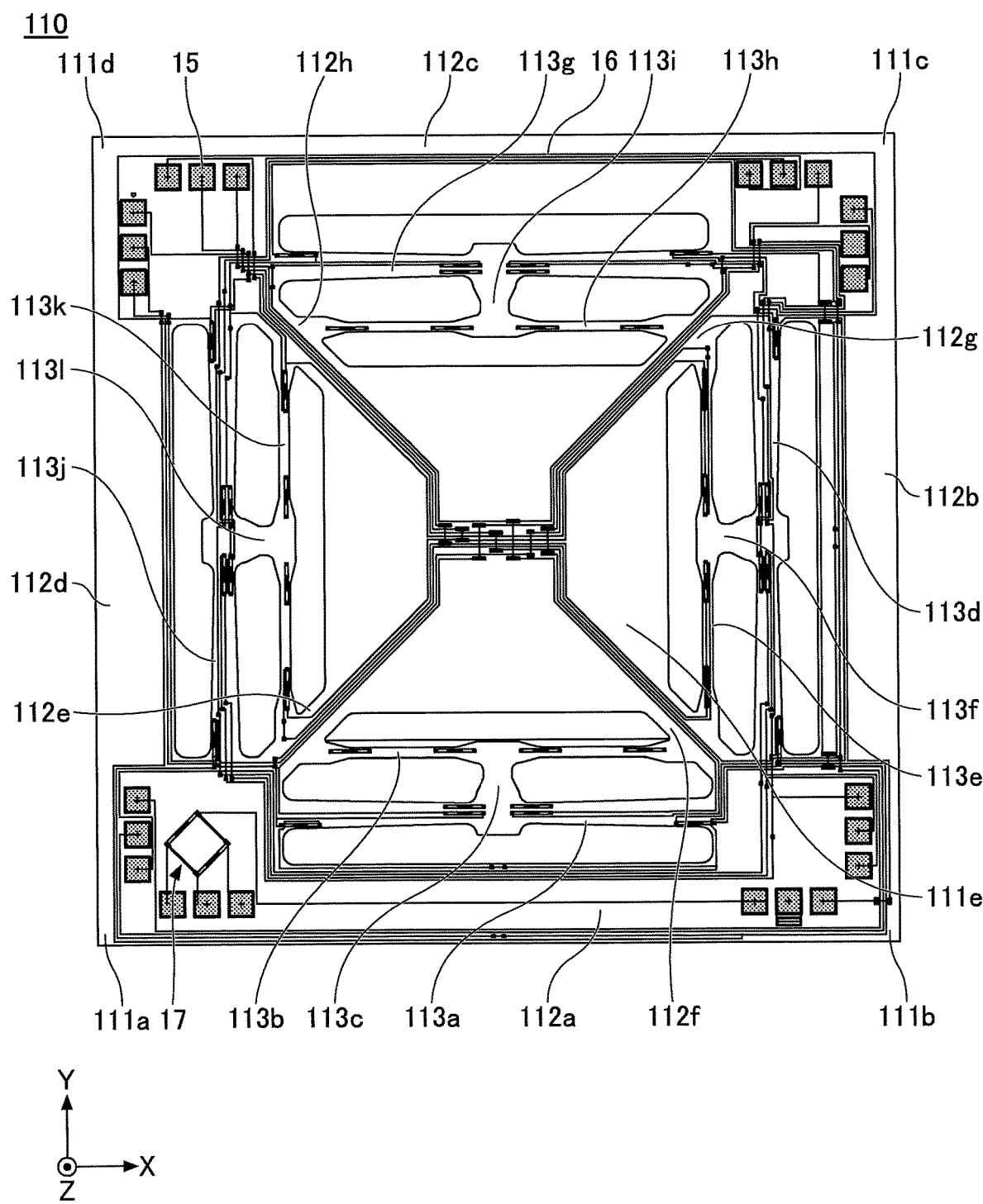
FIG. 7 is a drawing illustrating an arrangement of electrodes and wiring in a sensor chip.

FIG. 7 is a plan view of the sensor chip 110 seen from above in the Z-axis direction and illustrates an arrangement of electrodes and wiring in the sensor chip 110. As illustrated in FIG. 7, the sensor chip 110 includes multiple electrodes 15 to output electric signals. The electrodes 15 are disposed on the upper surfaces of the supports 111a through 111d that are least strained when forces are applied to the force points 114a through 114d. Wiring 16 from the respective piezoresistors to the electrodes 15 is laid out on the reinforcing beams and the detection beams.

Thus, the reinforcing beams can also be used as bypass routes to lay out the wiring as necessary. Accordingly, providing the reinforcing beams separately from the detection beams can improve the flexibility in wiring design. This also makes it possible to lay out the piezoresistors in ideal positions.

Figure 8:
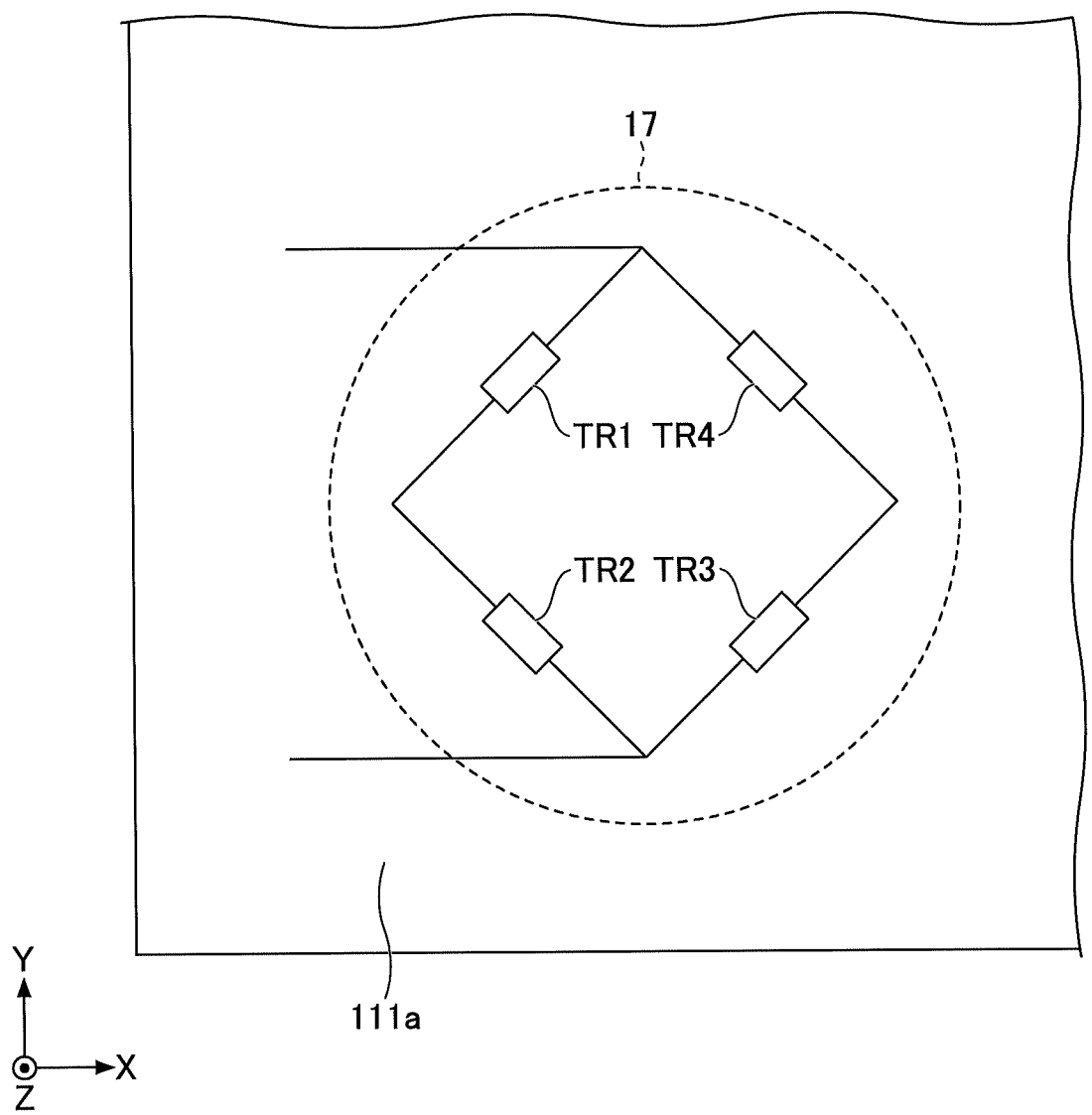
FIG. 8 is a drawing illustrating a temperature sensor in a sensor chip.

FIG. 8 is an enlarged plan view illustrating a temperature sensor 17 of the sensor chip 110. As illustrated in FIGS. 7 and 8, the sensor chip 110 includes the temperature sensor 17 used to perform temperature correction on the piezoresistors for strain detection. The temperature sensor 17 includes bridge-connected piezoresistors TR1, TR2, TR3, and TR4.

A pair of the piezoresistors TR1, TR2, TR3, and TR4 facing each other are formed to have a characteristic similar to that of, for example, the piezoresistor MxR1 used for strain detection. Another pair of the piezoresistors TR1, TR2, TR3, and TR4 facing each other are formed to have a characteristic different from that of, for example, the piezoresistor MxR1 by changing the impurity concentration in an impurity semiconductor. With this configuration, the balance of the bridge is disrupted by a temperature change, which enables temperature detection.

All of the piezoresistors (such as MxR1) used for strain detection are disposed horizontally or perpendicularly to the crystal orientation of a semiconductor substrate (e.g., silicon) forming the sensor chip 110. This configuration makes it possible to obtain a greater change in resistance in response to the same strain and thereby makes it possible to improve the accuracy in measuring applied forces and moments.

In contrast, the piezoresistors TR1, TR2, TR3, and TR4 constituting the temperature sensor 17 are inclined by 45 degrees with respect to the crystal orientation of the semiconductor substrate (e.g., silicon) forming the sensor chip 110. This configuration makes it possible to reduce the resistance change in response to a stress and thereby makes it possible to accurately detect only a temperature change.

The temperature sensor 17 is disposed on the upper surface of the support 111a that is least strained when forces are applied to the force points 114a through 114d. This configuration can further reduce the resistance change in response to a stress.

The piezoresistors are examples of strain detectors of the present embodiment.

Figure 9A:
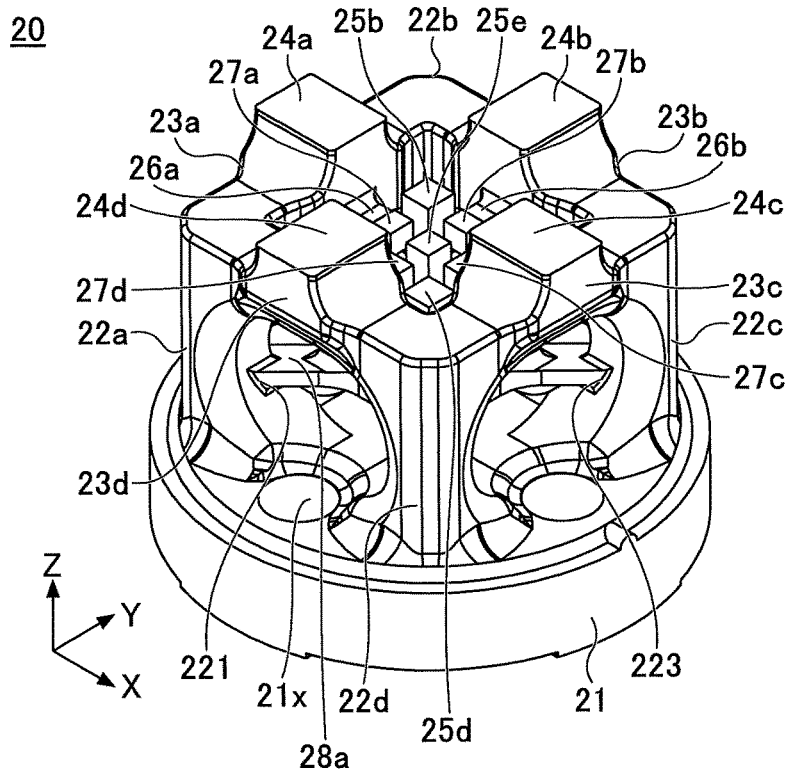
FIGS. 9A and 9B are drawings illustrating a strain body.
Figure 9B:
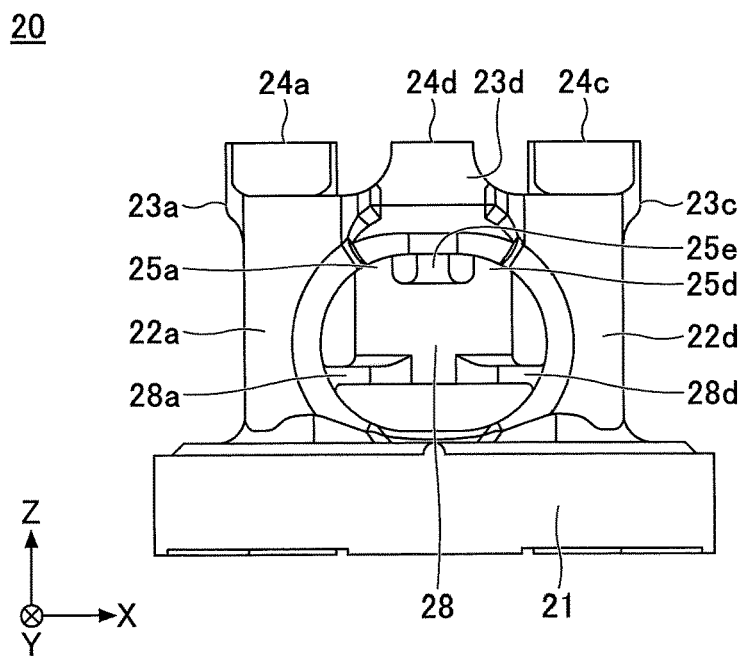
Figure 10A:
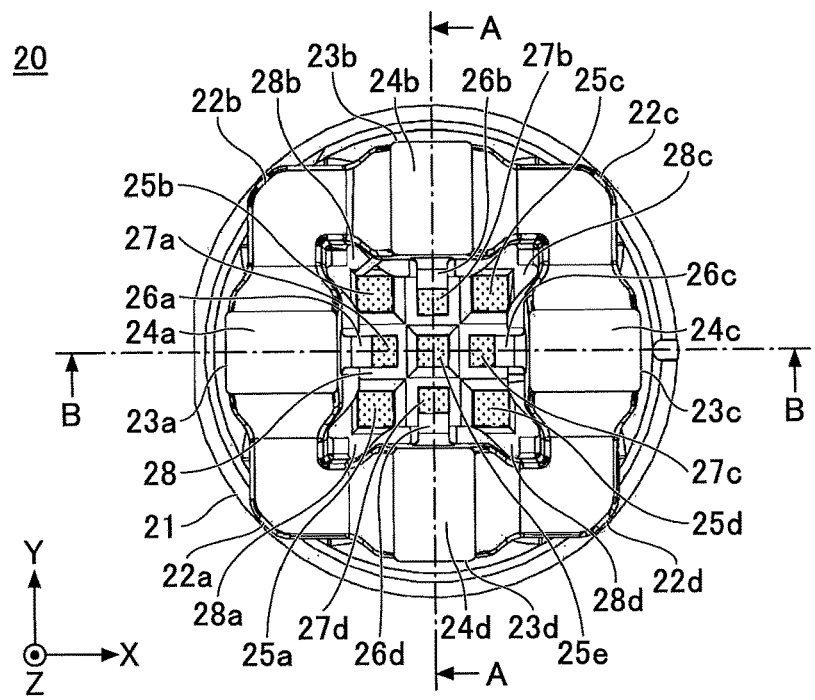
FIGS. 10A and 10B are drawings illustrating a strain body.
Figure 10B:
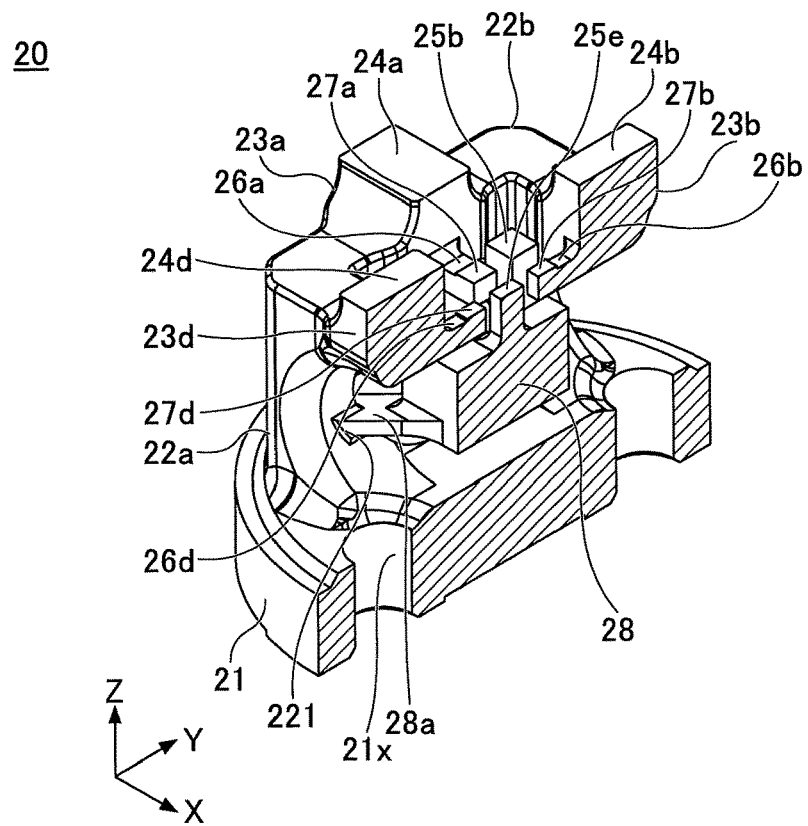
Figure 11A:
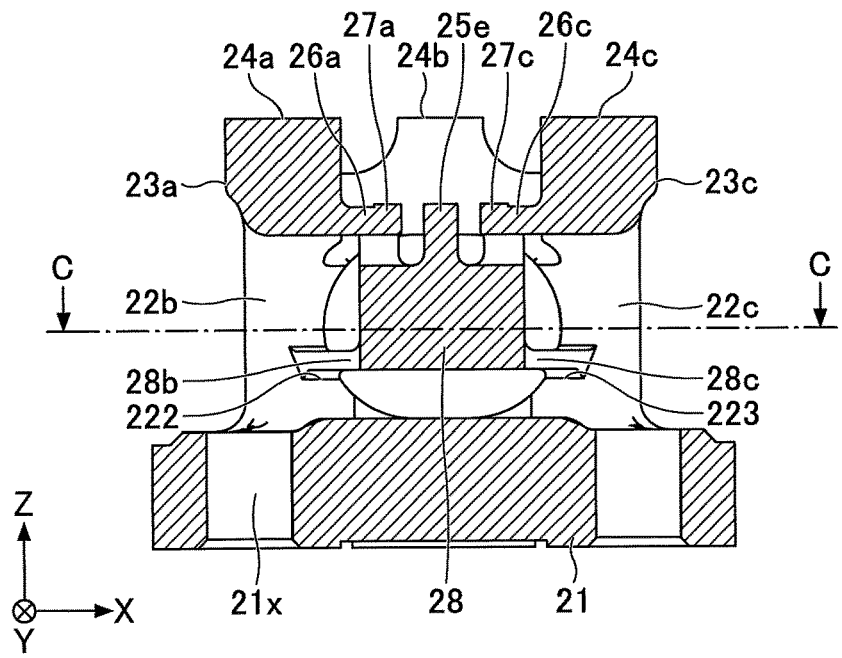
FIGS. 11A and 11B are drawings illustrating a strain body.
Figure 11B:
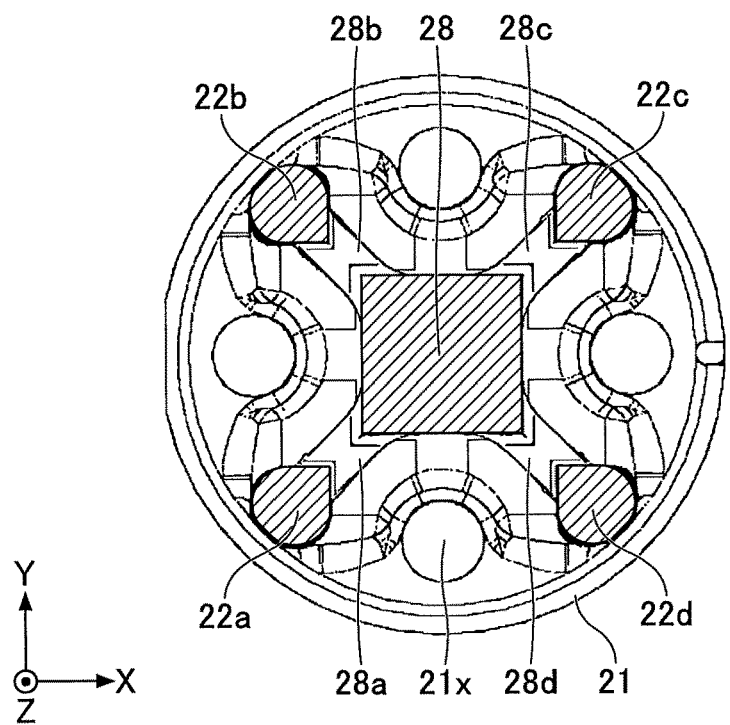

FIG. 9A is a perspective view and FIG. 9B is a side view of the strain body 20. FIG. 10A is a plan view of the strain body 20, and FIG. 10B is a cross-sectional perspective view of the strain body 20 taken along line A-A of FIG. 10A. In FIG. 10A, surfaces at the same height are indicated by the same hatching. FIG. 11A is a vertical cross-sectional view of the strain body 20 taken along line B-B of FIG. 10A, and FIG. 11B is a horizontal cross-sectional view of the strain body 20 taken along line C-C of FIG. 11A.

As illustrated in FIGS. 9A through 11B, the strain body 20 includes a base 21 that is directly attached to an object, a column 28 to be used as a sensor chip mount on which the sensor chip 110 is mounted, and columns 22a through 22d that are disposed around and apart from the column 28.

More specifically, in the strain body 20, the columns 22a through 22d are arranged on the upper surface of the base 21 having a substantially-circular shape at substantially the same distance from (or point-symmetric to) the center of the base 21. Four beams 23a through 23d, which may be referred to as "first beams", are provided to connect adjacent columns to each other. The beams 23a through 23d are arranged to form a frame shape. The column 28 is disposed above the center of the upper surface of the base 21. The planar shape of the base 21 is not limited to a circular shape. For example, the base 21 may have a polygonal shape such as a square.

The column 28 is thicker and shorter than the columns 22a through 22d. The sensor chip 110 is fixed to the upper side of the column 28 so as not to protrude from the upper surfaces of the columns 22a through 22d.

The column 28 is not directly fixed to the upper surface of the base 21. Instead, the column 28 is fixed via connecting beams 28a through 28d to the columns 22a through 22d. Accordingly, there is a space between the upper surface of the base 21 and the lower surface of the column 28. The lower surface of the column 28 and the lower surfaces of the connecting beams 28a through 28d are in the same plane.

The horizontal cross section of a portion of the column 28 connected to the connecting beams 28a through 28d has, for example, a rectangular shape. Four corners of the rectangle of the column 28 and the columns 22a through 22d facing the four corners are connected to each other via the connecting beams 28a through 28d. Positions 221 through 224 at which the connecting beams 28a through 28d are connected to the columns 22a through 22d are preferably located lower than the centers of the columns 22a through 22d in the height direction. The reason for this configuration is described later. The shape of the horizontal cross section of the portion of the column 28 connected to the connecting beams 28a through 28d is not limited to a rectangle, but may also be a circle or a polygon (e.g., hexagon).

The connecting beams 28a through 28d are disposed at a predetermined distance from and substantially parallel to the upper surface of the base 21, and are arranged at substantially the same distance from (or point symmetric to) the center of the base 21. The width and thickness (rigidity) of the connecting beams 28a through 28d are preferably less than those of the columns 22a through 22d and the beams 23a through 23d so as not to prevent the deformation of the strain body 20.

Thus, the upper surface of the base 21 and the lower surface of the column 28 are apart from each other by a predetermined distance. The predetermined distance is, for example, several mm. The technical significance of not directly fixing the column 28 to the upper surface of the base 21 and separating the upper surface of the base 21 and the lower surface of the column 28 by the predetermined distance is described later with reference to FIGS. 17A through 22B.

The base 21 includes through holes 21x used to fix the strain body 20 to an object with, for example, screws. In the present embodiment, four through holes 21x are formed in the base 21. However, the number of the through holes 21x may be freely determined.

For example, the overall shape of the strain body 20 excluding the base 21 may be roughly a cuboid with a length of about 5000 μm, a width of about 5000 μm, and a height of about 7000 μm. The shape of the horizontal cross section of each of the columns 22a through 22d may be, for example, a square each side of which is about 1000 μm. The shape of the horizontal cross section of the column 28 may be, for example, a square each side of which is about 2000 μm.

In the strain body 20, parts forming inside corners are preferably rounded to suppress stress concentration. For example, the upper and lower portions of a surface of each of the columns 22a through 22d facing the center of the upper surface of the base 21 are preferably rounded. Similarly, the right and left portions of a surface of each of the beams 23a through 23d facing the upper surface of the base 21 are preferably rounded.

The beams 23a through 23d include protrusions that protrude upward from the centers of the beams 23a through 23d in the longitudinal direction. Input parts 24a through 24d having, for example, a quadrangular prism shape are provided on the protrusions. The input parts 24a through 24d receive external forces. When forces are applied to the input parts 24a through 24d, the beams 23a through 23d and the columns 22a through 22d deform according to the applied forces.

Compared with a configuration where, for example, one input part is provided, providing four input parts 24a through 24d makes it possible to increase the load capacity of the beams 23a through 23d.

Four columns 25a through 25d are provided at the four corners of the upper surface of the column 28. Also, a column 25e, which may be referred to as a "fourth column", is provided in the center of the upper surface of the column 28. The columns 25a through 25e have the same height.

In other words, the upper surfaces of the columns 25a through 25e are in the same plane. The upper surfaces of the columns 25a through 25e function as bonding parts to which the lower surface of the sensor chip 110 is bonded.

Beams 26a through 26d protrude in the horizontal direction from the centers of the inner surfaces of the beams 23a through 23d in the longitudinal direction. The beams 26a through 26d may be referred to as "second beams" that transfer deformation of the beams 23a through 23d and the columns 22a through 22d to the sensor chip 110. Protrusions 27a through 27d protrude upward from the upper surfaces of the end portions of the beams 26a through 26d.

The protrusions 27a through 27d have the same height. In other words, the upper surfaces of the protrusions 27a through 27d are in the same plane. The upper surfaces of the protrusions 27a through 27d function as bonding parts to which the lower surface of the sensor chip 110 is bonded. The beams 26a through 26d and the protrusions 27a through 27d are connected to the beams 23a through 23d that are movable parts and therefore deform according to forces applied to the input parts 24a through 24d.

In a state where no force is applied to the input parts 24a through 24d, the upper surfaces of the columns 25a through 25e and the upper surfaces of the protrusions 27a through 27d are in the same plane.

The base 21, the columns 22a through 22d, the column 28, the beams 23a through 23d, the input parts 24a through 24d, the columns 25a through 25e, the beams 26a through 26d, and the protrusions 27a through 27d are preferably formed as a monolithic part in order to achieve rigidity and to accurately form these components. The strain body 20 may be formed of, for example, a hard metal material such as stainless steel (SUS). Preferably, the strain body 20 may be formed of SUS630 that is hard and has a high mechanical strength.

Thus, similarly to the sensor chip 110, the strain body 20 has a structure including columns and beams. With this configuration, the strain body 20 deforms differently in six axial directions according to applied forces, and can transform deformation to the sensor chip 110 such that six axial forces/moments are accurately distinguishable.

Forces applied to the input parts 24a through 24d of the strain body 20 are transferred via the columns 22a through 22d, the beams 23a through 23d, and the beams 26a through 26d to the sensor chip 110, and the sensor chip 110 detects displacements. In the sensor chip 110, the six axial forces/moments are output from the corresponding bridge circuits each of which corresponds to one axis.

<Process of Manufacturing Force Sensor>

Figure 12A:
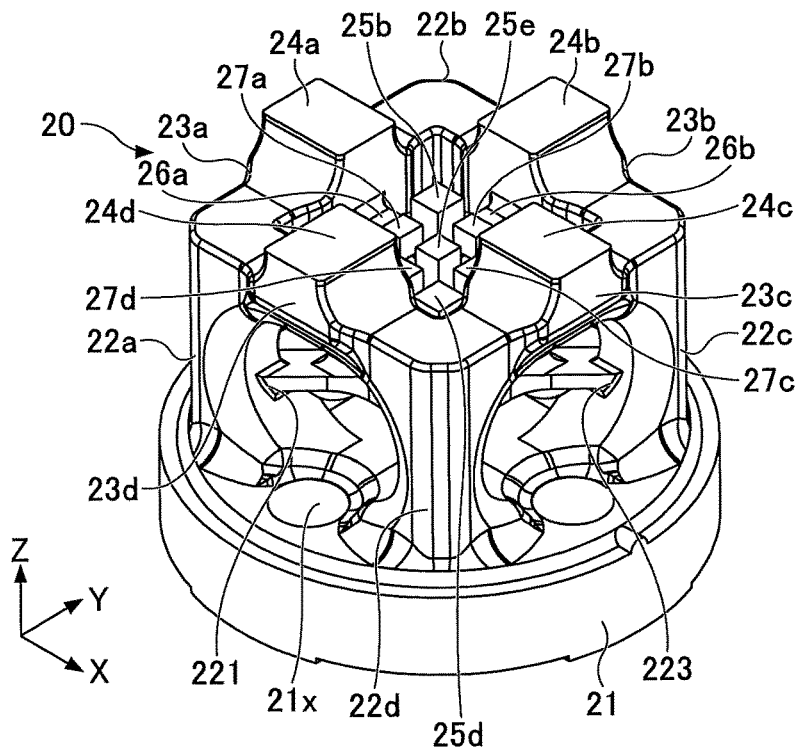
FIGS. 12A and 12B are drawings used to describe a process of manufacturing a force sensor.

FIGS. 12A through 14B are drawings used to describe a process of manufacturing the force sensor 1. First, as illustrated in FIG. 12A, the strain body 20 is produced. For example, the strain body 20 may be formed as a monolithic part by molding, cutting, or wire electric discharge machining. The strain body 20 may be formed of, for example, a hard metal material such as stainless steel (SUS). Preferably, the strain body 20 may be formed of SUS630 that is hard and has a high mechanical strength. When producing the strain body 20 made of metal by molding, for example, metal particles and a resin used as a binder are placed in a mold to shape a structure, and the shaped structure is sintered to evaporate the resin.

Figure 12B:
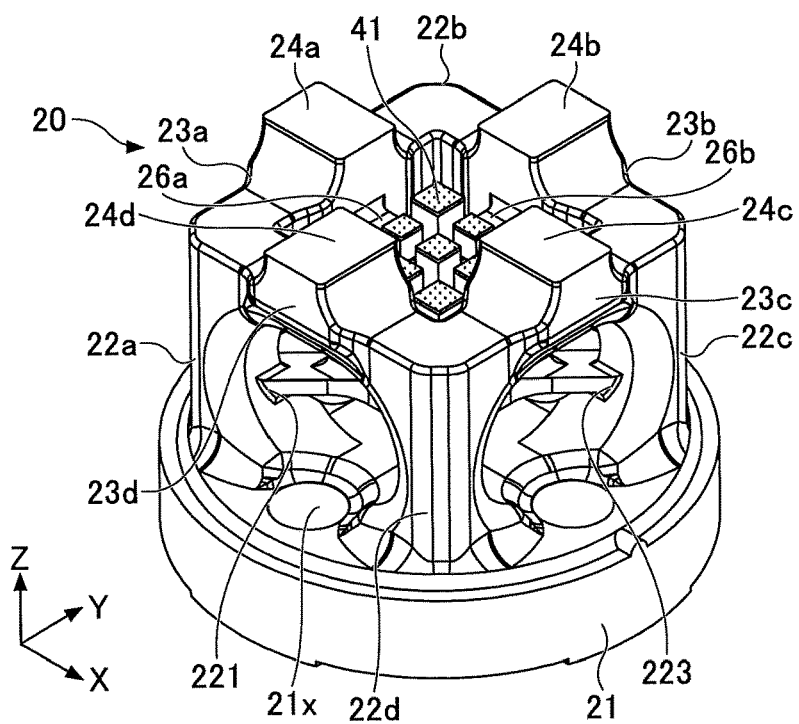

Next, at a step illustrated by FIG. 12B, an adhesive 41 is applied to the upper surfaces of the columns 25a through 25e and the protrusions 27a through 27d. For example, an epoxy adhesive may be used as the adhesive 41. In terms of the capacity to bear applied external forces, the adhesive 41 preferably has a Young's modulus of greater than or equal to 1 GPa and a thickness of less than or equal to 20 μm.

Figure 13A:
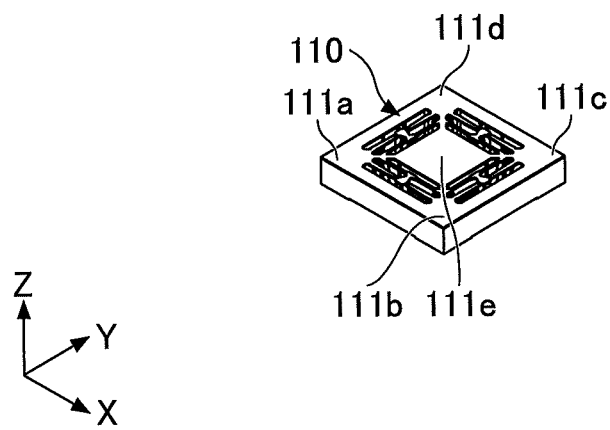
FIGS. 13A and 13B are drawings used to describe a process of manufacturing a force sensor.

At a step illustrated by FIG. 13A, the sensor chip 110 is produced. The sensor chip 110 may be produced by any known method. For example, the sensor chip 110 may be produced by preparing an SOI substrate and performing etching (e.g., reactive ion etching) on the SOI substrate. Also, electrodes and wiring may be formed, for example, by forming a metal film such as an aluminum film on the surface of the SOI substrate by sputtering, and patterning the metal film by photolithography.

Figure 13B:
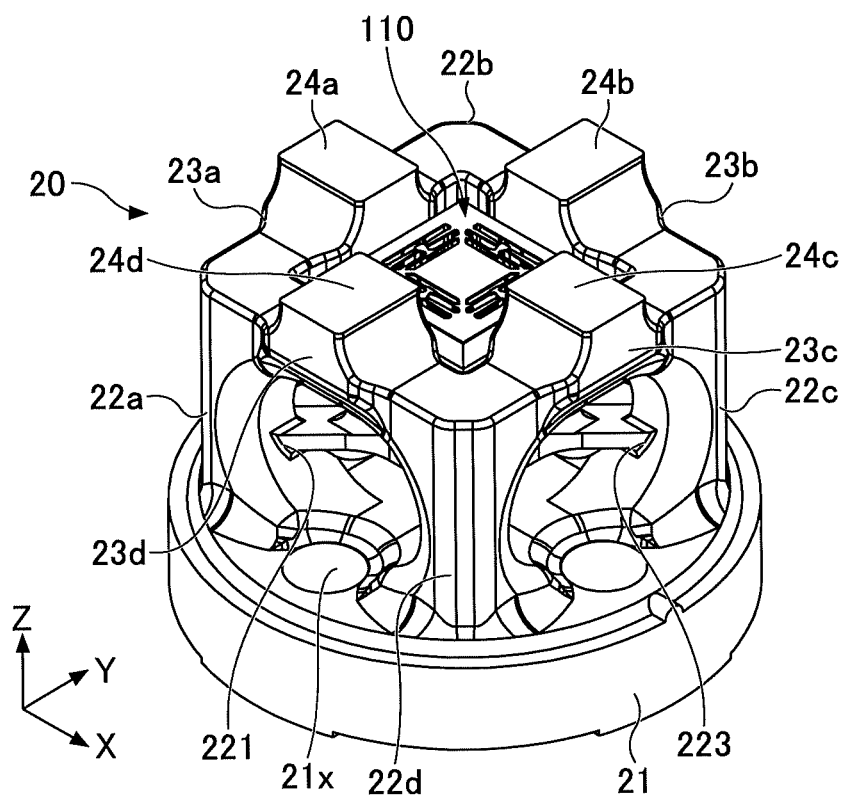

Next, at a step illustrated by FIG. 13B, the sensor chip 110 is placed on the strain body 20 while being pressed such that the lower surface of the sensor chip 110 contacts the adhesive 41 is applied to the upper surfaces of the columns 25a through 25e and the protrusions 27a through 27d. Then, the adhesive 41 is heated to a predetermined temperature and is thereby cured. As a result, the sensor chip 110 is fixed to the strain body 20. More specifically, the supports 111a through 111d of the sensor chip 110 are fixed to the columns 25a through 25d of the strain body 20, the support 111e is fixed to the column 25e, and the force points 114a through 114d are fixed to the protrusions 27a through 27d.

Figure 14A:
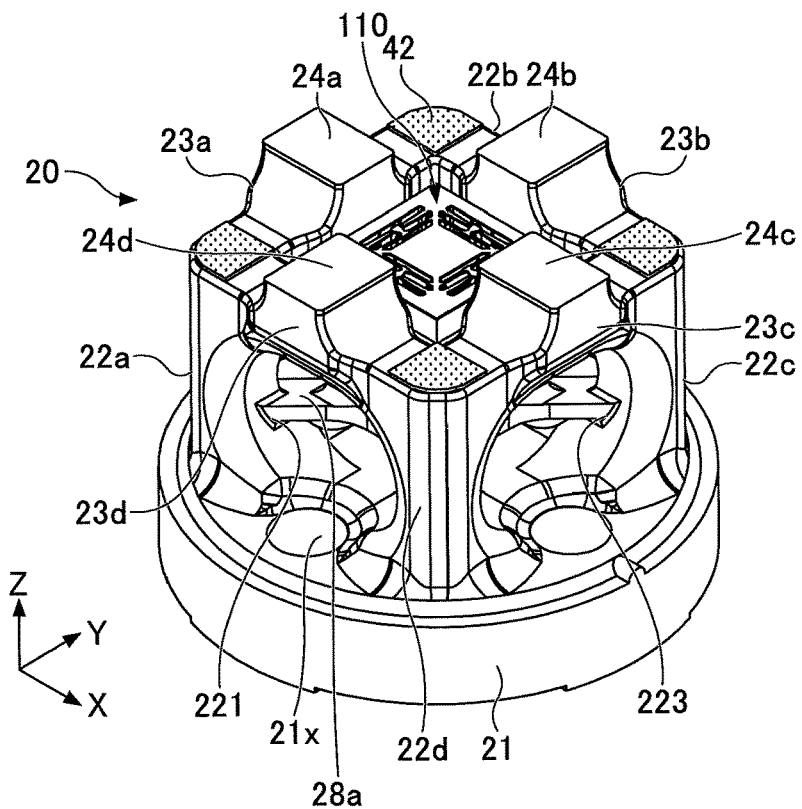
FIGS. 14A and 14B are drawings used to describe a process of manufacturing a force sensor.

Next, at a step illustrated by FIG. 14A, an adhesive 42 is applied to the upper surfaces of the columns 22a through 22d. For example, an epoxy adhesive may be used as the adhesive 42. The adhesive 42 is used to fix the input-output board 30 to the strain body 20, and no external force is applied to the adhesive 42. Therefore, a general-purpose adhesive can be used as the adhesive 42.

Figure 14B:
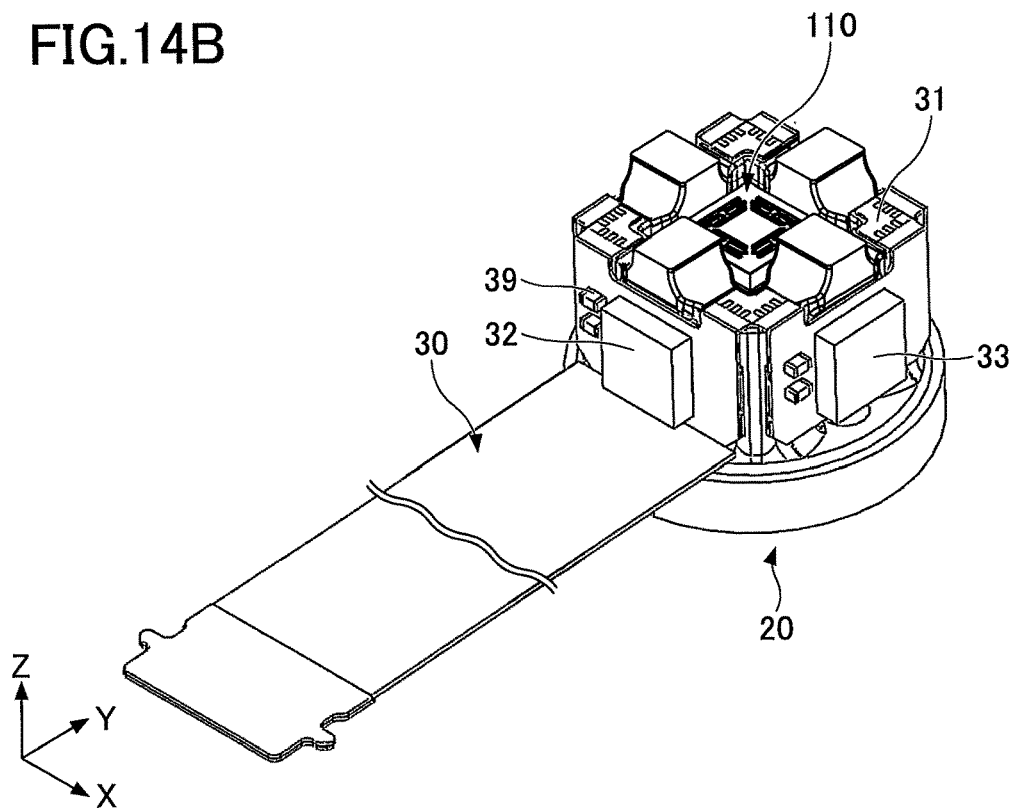

Next, at a step illustrated by FIG. 14B, the input-output board 30, on which the active components 32 through 35 and the passive components 39 are mounted, is prepared. The prepared input-output board 30 is placed on the strain body 20 such that lower surfaces of the input-output board 30 contact the adhesive 42 applied to the upper surfaces of the columns 22a through 22d. Then, the adhesive 42 is heated to a predetermined temperature and is thereby cured while pressing the input-output board 30 against the strain body 20. As a result, the input-output board 30 is fixed to the strain body 20.

The input-output board 30 is fixed to the strain body 20 such that the sensor chip 110 and the input parts 24a through 24d are exposed. The electrodes 31 of the input-output board 30 are preferably disposed on the columns 22a through 22d of the strain body 20 that are least strained when forces are applied to the input parts 24a through 24d.

Thereafter, portions of the input-output board (excluding a portion including an input terminal) protruding out of the strain body 20 in the horizontal direction are bent to extend along the lateral sides of the strain body 20. The corresponding components of the input-output board 30 and the sensor chip 110 are electrically connected to each other via, for example, bonding wires (not' shown). As a result, the force sensor 1 is completed.

Thus, the force sensor 1 is implemented by only three modules, i.e., the sensor chip 110, the strain body 20, and the input-output board 30. This configuration makes it possible to easily assemble the force sensor 1. Also, because the process of aligning the modules is minimized, it is possible to prevent degradation in accuracy resulting from assembling errors.

Also, because the surfaces (the upper surfaces of the columns 25a through 25e and the protrusions 27a through 27d) of the strain body 20 to be bonded to the sensor chip 110 are in the same plane, the alignment of the sensor chip 110 with the strain body 20 can be performed by one step. This in turn makes it easier to mount the sensor chip 110 on the strain body 20.

First Variation of First Embodiment

In a first variation of the first embodiment, a force sensor including a force-receiving plate is described. In the first variation of the first embodiment, descriptions of components that are the same as the components described in the first embodiment may be omitted.

Figure 15:
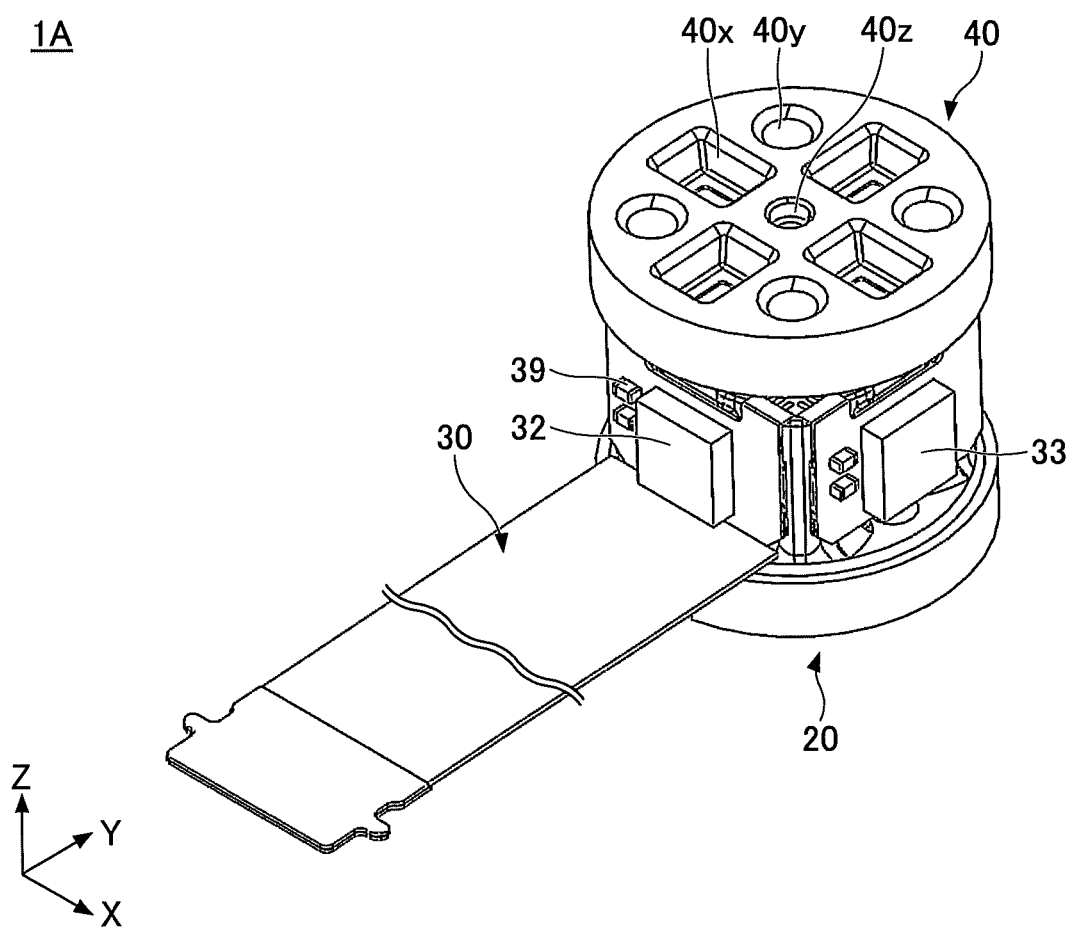
FIG. 15 is a perspective view of a force sensor according to a first variation of the first embodiment.
Figure 16A:
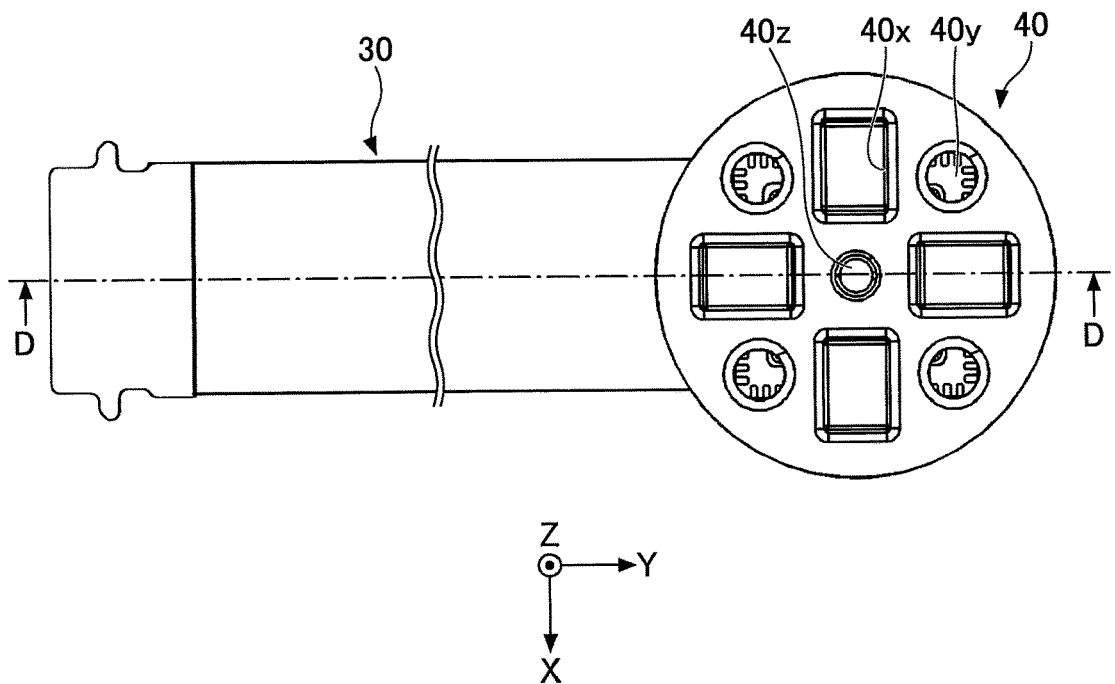
FIGS. 16A and 16B are drawings illustrating the force sensor according to the first variation of the first embodiment.
Figure 16B:
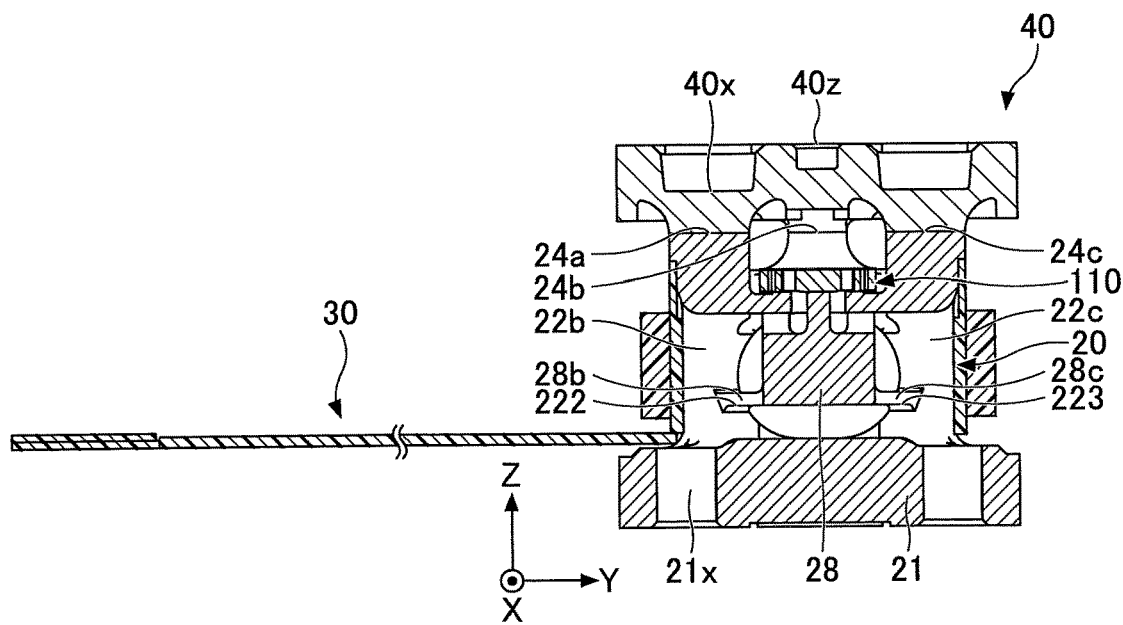

FIG. 15 is a perspective view of a force sensor 1A according to the first variation of the first embodiment. FIG. 16A is a plan view of the force sensor 1A, and FIG. 16B is a vertical cross-sectional view taken along line D-D of FIG. 16A. Referring to FIGS. 15, 16A, and 16B, the force sensor 1A is different from the force sensor 1 in that a force-receiving plate 40 is provided on the input parts 24a through 24d of the strain body 20.

The force-receiving plate 40 may have, for example, a circular planar shape. However, the force-receiving plate 40 may have any other planar shape such as a rectangle. Four recesses 40x with a rectangular planar shape and four through holes 40y with a circular planar shape are formed in the upper surface of the force-receiving plate 40. Also, a recess 40z with a circular planar shape is formed in the center of the upper surface of the force-receiving plate 40.

The four recesses 40x are disposed to cover the corresponding input parts 24a through 24d of the strain body 20. The bottom surfaces of the recesses 40x protrude toward the strain body 20 and are in contact with the upper surfaces of the input parts 24a through 24d of the strain body 20. The recesses 40x, the through holes 40y, and the recess 40z may also have other planar shapes.

The above configuration makes it possible to align the force-receiving plate 40 with the strain body 20. As necessary, the recesses 40x and the recess 40z may also be used to align the force sensor 1A with an object when attaching the force sensor 1A to the object. The through holes 40y are screw holes used to screw the force sensor 1A to the object.

The force-receiving plate 40 may be formed of, for example, stainless steel such as SUS630. For example, the force-receiving plate 40 may be fixed to the strain body 20 by welding, bonding, or screwing.

With the above configuration, it is possible to apply external forces to the input parts 24a through 24d of the strain body 20 via the force-receiving plate 40.

<Simulation 1>

FIGS. 17A through 18B are drawings used to describe offsets generated in Fz outputs of the sensor chip 110 when strain bodies are fixed to an object.

Figure 17A:
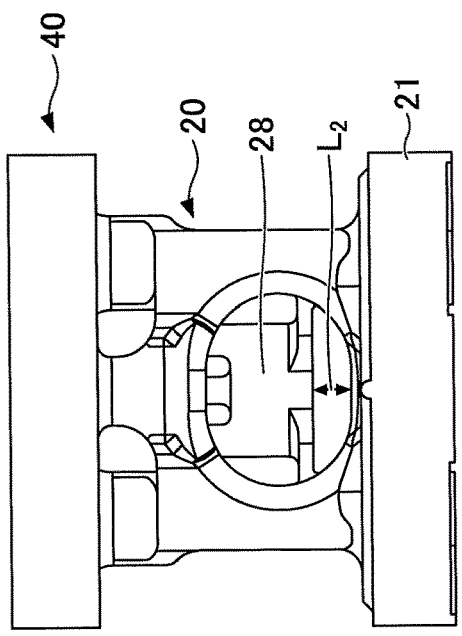
FIGS. 17A through 17C are drawings used to describe offsets generated in Fz outputs of a sensor-chip.
Figure 17B:
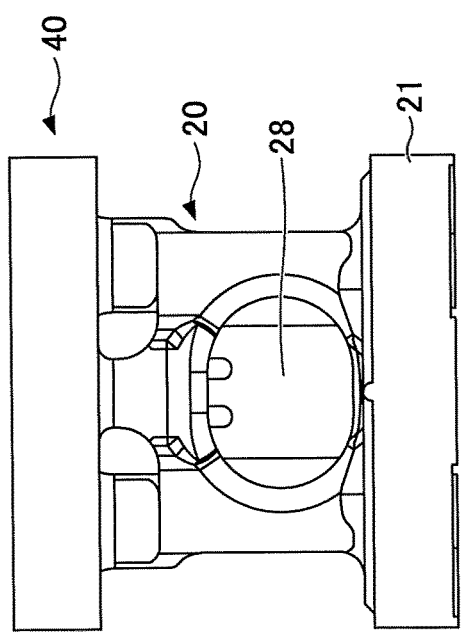
Figure 17C:
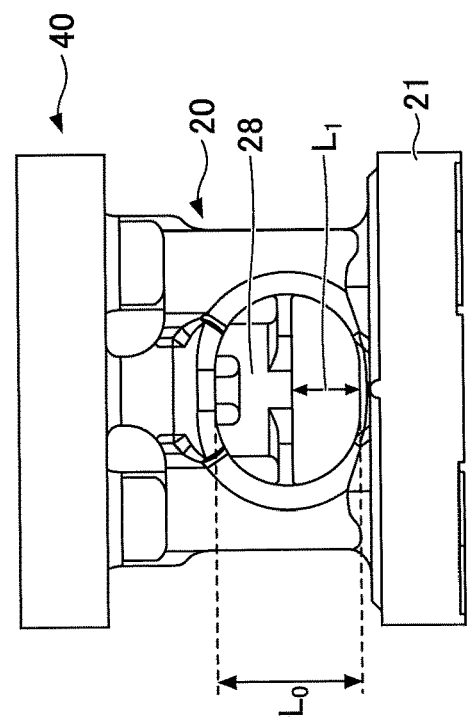

As illustrated in FIGS. 17A through 17C, three types of force sensors were prepared. The force sensors include strain bodies that are prepared by changing the distance between the upper surface of the base 21 and the lower surface of the column 28.

In an example 1 illustrated by FIG. 17A, a distance $L_1$ between the upper surface of the base 21 and the lower surface of the column 28 is 1.3 mm. In the example 1 of FIG. 17A, the distance $L_1$ between the upper surface of the base 21 and the lower surface of the column 28 is about one half of a height $L_0$ of the columns 22a through 22d. That is, the column 28 is connected to the columns 22a through 22d at positions that are substantially in the middle of the respective columns 22a through 22d. Here, the height $L_0$ of the columns 22a through 22d is defined as a distance from the highest position of the base 21 to the lower surface of the corresponding beam (23a-23d).

In an example 2 illustrated by FIG. 17B, a distance $L_2$ between the upper surface of the base 21 and the lower surface of the column 28 is 0.5 mm. In the example 2 of FIG. 17B, the distance $L_2$ between the upper surface of the base 21 and the lower surface of the column 28 is less than one half of the height $L_0$ of the columns 22a through 22d. That is, the column 28 is connected to the columns 22a through 22d at positions that are lower than the middle of the respective columns 22a through 22d.

In a comparative example illustrated by FIG. 17C, the column 28 is formed directly on the upper surface of the base 21, and the distance between the upper surface of the base 21 and the lower surface of the column 28 is zero.

Figure 18A:
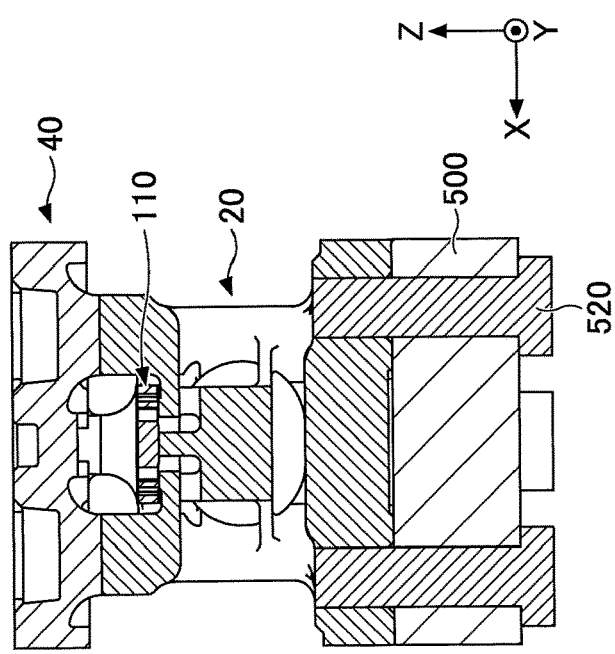
FIGS. 18A through 18D are drawings used to describe offsets generated in Fz outputs of a sensor-chip.
Figure 18B:
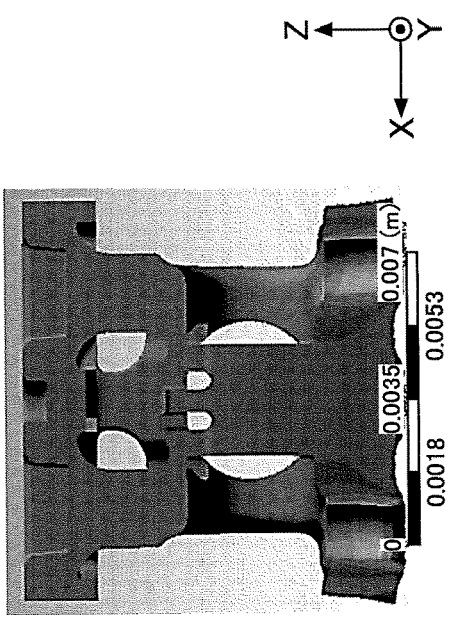
Figure 18C:
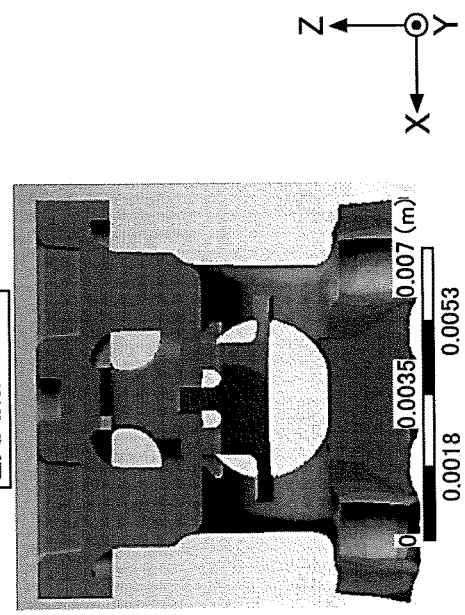
Figure 18D:
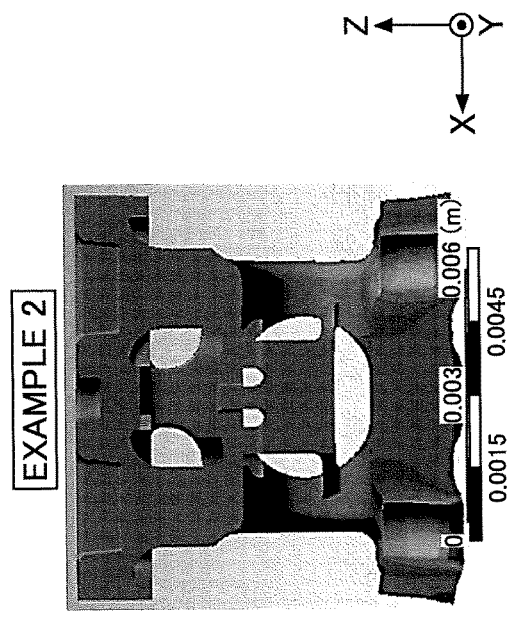

As illustrated by FIG. 18A, each of the force sensors of FIGS. 17A through 17C is fastened to an object 500 made of a metal by using four screws 520 (which is hereafter referred to as "screw fastening"). FIGS. 18B through 18D illustrate simulation results of deformation of the strain body 20 obtained when the force sensors of FIGS. 17A through 17C are screwed as illustrated by FIG. 18A.

As illustrated in FIG. 18B, with the configuration of the comparative example (FIG. 17C), the column 28 is deformed as a result of the screw fastening. In contrast, as illustrated in FIG. 18C, with the configuration of the example 1 (FIG. 17A), the deformation of the column 28 resulting from the screw fastening is greatly reduced compared with the case of FIG. 18B. Also, as illustrated in FIG. 18D, with the configuration of the example 2 (FIG. 17B), the deformation of the column 28 resulting from the screw fastening is greatly reduced compared with the case of FIG. 18B, but is greater than the deformation in the example 1 of FIG. 18C.

FIG. 19 is a graph illustrating simulation results of Fz outputs (offsets) of the sensor chip 110 in the states of FIGS. 18B through 18D. In FIG. 19, the Fz output (offset) of the comparative example is indicated as 100%. As illustrated by FIG. 19, compared with the configuration of the comparative example, the Fz output (offset) is reduced to 8% with the configuration of the example 1, and the Fz output (offset) is reduced to 27% with the configuration of the example 2.

Thus, it has been confirmed that the deformation of the column 28 resulting from the screw fastening decreases and the Fz output (offset) of the sensor chip 110 decreases as the distance between the upper surface of the base 21 and the lower surface of the column 28 increases.

Figures 20A, 20B:
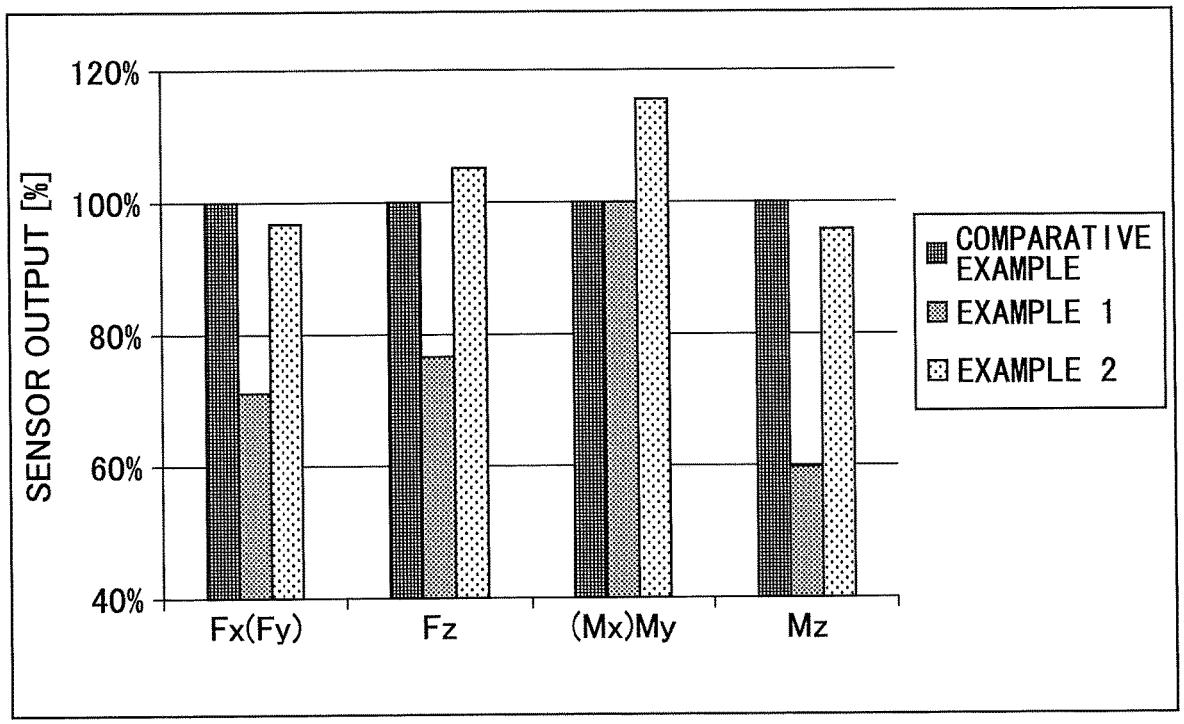
FIG. 20A is a graph and FIG. 20B is a table illustrating simulation results of sensor chip outputs for configurations of a comparative example, an example 1, and an example 2.

FIG. 20A is a graph and FIG. 20B is a table illustrating simulation results of outputs of the sensor chip 110 for the respective configurations of the comparative example, the example 1, and the example 2. In FIGS. 20A and 20B, output levels observed with the comparative example when the same force or moment is applied in the respective directions are indicated as 100%.

As indicated by FIGS. 20A and 20B, comparing the example 1 with the comparative example, the Mx (My) output of the example 1 is substantially the same as that of the comparative example, but the Fx (Fy), Fz, and Mz outputs of the example 1 are decreased to about 60 to 80% of those of the comparative example.

Comparing the example 2 with the comparative example, the Fx (Fy), Fz, and Mz outputs of the example 2 are within ±5% of those of the comparative example, i.e., substantially the same as those of the comparative example. In contrast, the Mx (My) output of the example 2 is significantly improved by 10% or more compared with the Mx (My) output of the comparative example.

In relation to the result where the Mx (My) output of the example 2 is improved from the Mx (My) output of the comparative example, a simulation was performed to analyze other axial components observed when a moment My is applied to each of the force sensors with the configurations of the comparative example and the example 2.

Figure 21B:
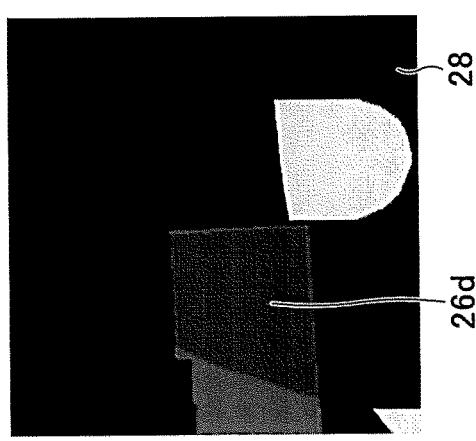
FIGS. 21A through 21D are drawings illustrating simulation results of other axial components for configurations of the comparative example and the example 2.
Figure 21D:
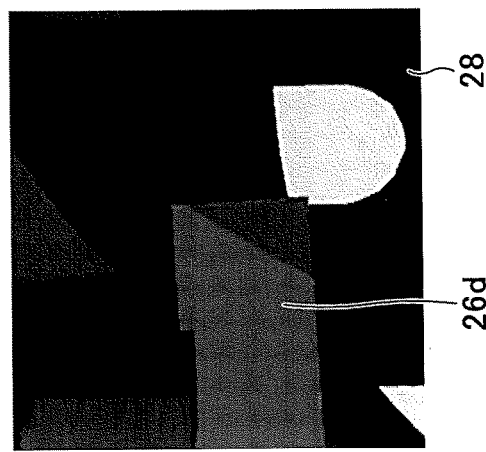
Figure 21A:
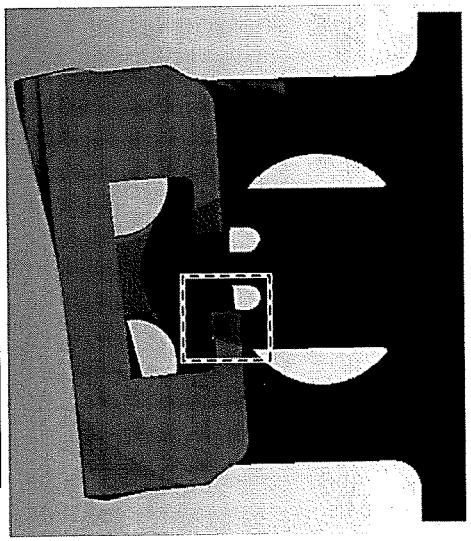

FIG. 21A indicates a simulation result for the configuration of the comparative example, and FIG. 21B is an enlarged view of an area surrounded by a dotted line in FIG. 21A. As indicated by FIGS. 21A and 21B, with the configuration of the comparative example, because the column 28 is formed directly on the upper surface of the base 21, the column 28 is almost not tilted and only the beam 26d is tilted when the moment My is applied (the same applied to the beams 26a through 26c). The inclination of the beam 26d with respect to the column 28 corresponds to the Fx component.

Figure 21C:
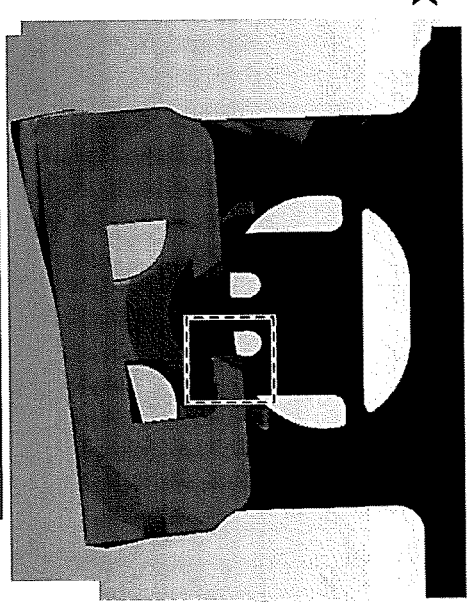

FIG. 21C indicates a simulation result for the configuration of the example 2, and FIG. 21D is an enlarged view of an area surrounded by a dotted line in FIG. 21C. As indicated by FIGS. 21C and 21D, with the configuration of the example 2, because the upper surface of the base 21 is apart from the lower surface of the column 28 and the column 28 is not fixed to the upper surface of the base 21, the column 28 and the beam 26d are tilted in the same direction when the moment My is applied (the same applied to the beams 26a through 26c).

Figure 22A:
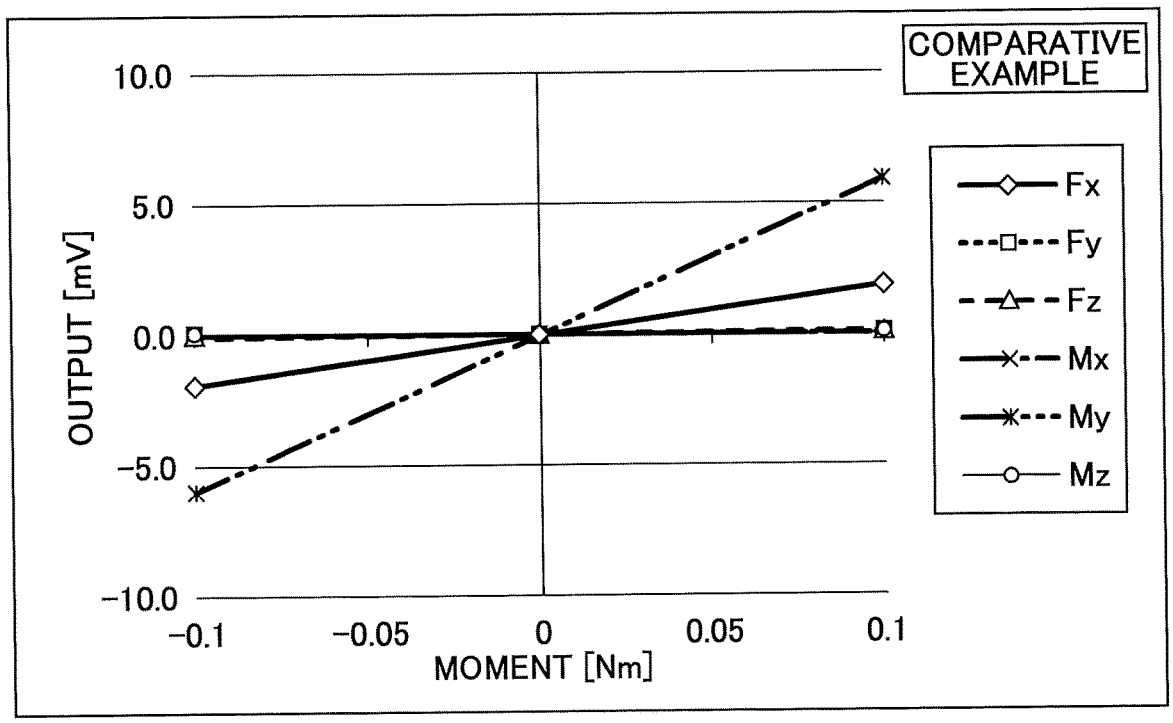
FIGS. 22A and 22B are drawings illustrating simulation results of other axial components for configurations of the comparative example and the example 2.
Figure 22B:
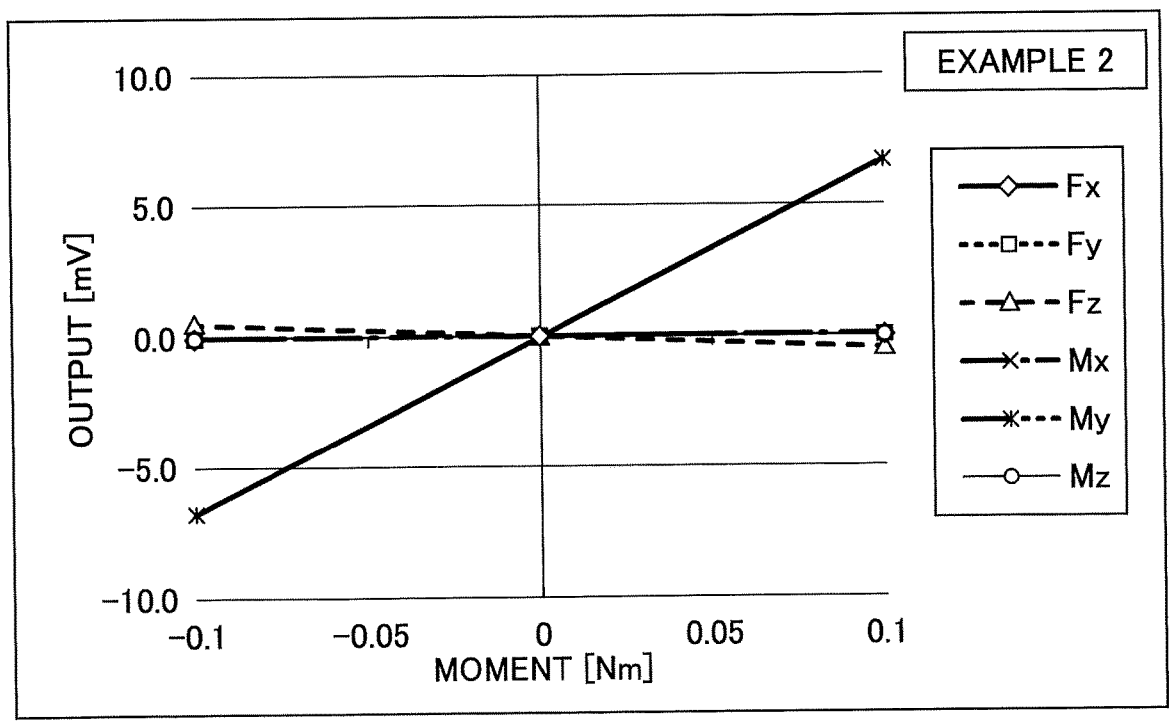

For the above reasons, with the configuration of the comparative example, the Fx component appears as illustrated in FIG. 22A when the moment My is applied; but with the configuration of the example 2, the Fx component does not appear as illustrated in FIG. 22B when the moment My is applied. With the configuration of the example 2, it is supposed that the My output improves by 10% or more from that of the comparative example because deformation corresponding to the non-appearing Fx component is added to the My output.

In short, when the column 28 is fixed via the connecting beams 28a through 28d to the columns 22a through 22d instead of directly fixing the column 28 to the upper surface of the base 21, the deformation of the column 28 resulting from the screw fastening decreases and the Fz output (offset) of the sensor chip 110 decreases as the distance between the upper surface of the base 21 and the lower surface of the column 28 increases. Meanwhile, the output of the sensor chip 110 decreases (the sensitivity decreases) as the distance between the upper surface of the base 21 and the lower surface of the column 28 increases.

Accordingly, the column 28 is preferably connected to the columns 22a through 22d at positions that are lower than the middle of the respective columns 22a through 22d. This configuration makes it possible to reduce the Fz output (offset) of the sensor chip 110 resulting from the screw fastening while maintaining the sensitivity of the sensor chip 110.

To reduce the Fz output (offset) of the sensor chip 110 resulting from the screw fastening by increasing the rigidity of the base 21, it is necessary to increase the thickness of the base 21, which results in an increase in the size of the entire force sensor. The above-described configuration, where the column 28 is fixed via the connecting beams 28a through 28d to the columns 22a through 22d instead of directly fixing the column 28 to the upper surface of the base 21, makes it possible to prevent an increase in the size of the entire force sensor and to reduce the Fz output (offset) of the sensor chip 110 resulting from the screw fastening.

Also, the configuration, where the column 28 is fixed via the connecting beams 28a through 28d to the columns 22a through 22d instead of directly fixing the column 28 to the upper surface of the base 21, makes it possible to accurately distinguish the moment components (Mx, My) resulting from inputs of moments (Mx, My) from the force components (Fx, Fy) in translational directions.

<Simulation 2>

The results of the simulation 1 indicate that the deformation of the column 28 resulting from the screw fastening decreases and the Fz output (offset) of the sensor chip 110 decreases as the distance between the upper surface of the base 21 and the lower surface of the column 28 increases.

However, depending on conditions such as a fastening force in the screw fastening, an offset in the opposite polarity may be generated if the distance between the upper surface of the base 21 and the lower surface of the column 28 is increased too much. In a simulation 2, a method for solving this problem is described.

Figure 23A:
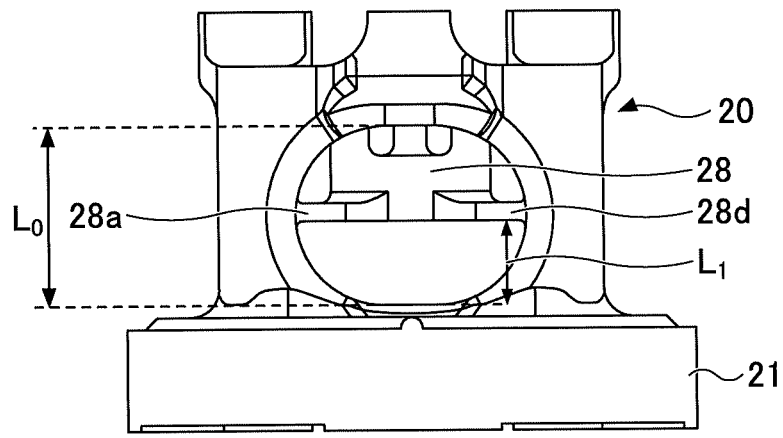
FIGS. 23A and 23B are drawings used to describe offsets generated in Fz outputs of a sensor-chip.
Figure 23B:
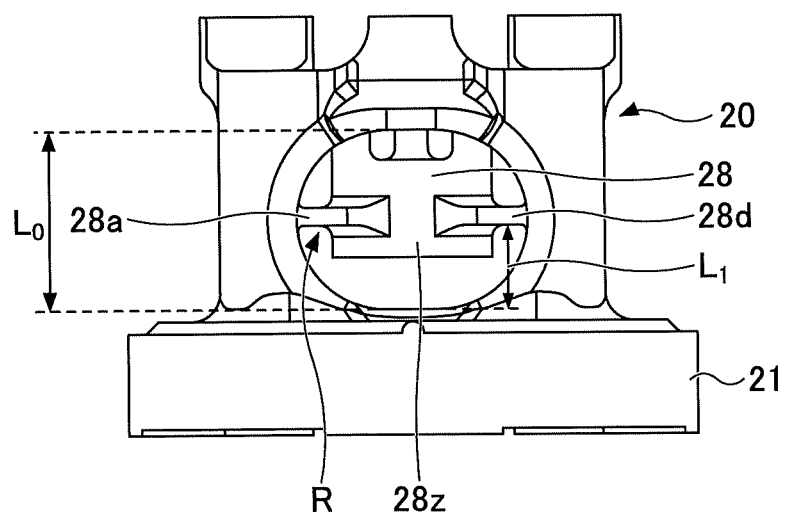

FIGS. 23A and 23B are drawings used to describe offsets generated in Fz outputs of the sensor chip 110 when the strain body 20 is fixed to an object.

As illustrated by FIGS. 23A and 23B, two types of force sensors were prepared. FIG. 23A illustrates a model of a force sensor that is substantially the same as the force sensor of FIG. 17A except that the force-receiving plate 40 is not provided. FIG. 23B illustrates a model of a force sensor where the strain body 20 includes a protrusion 28z that protrudes downward (toward the base 21) from the lower surface of the column 28 to a position lower than the lower surfaces of the connecting beams 28a through 28d. In FIG. 23B, the joints between the connecting beams 28a through 28d and the protrusion 28z are rounded.

Figure 24:
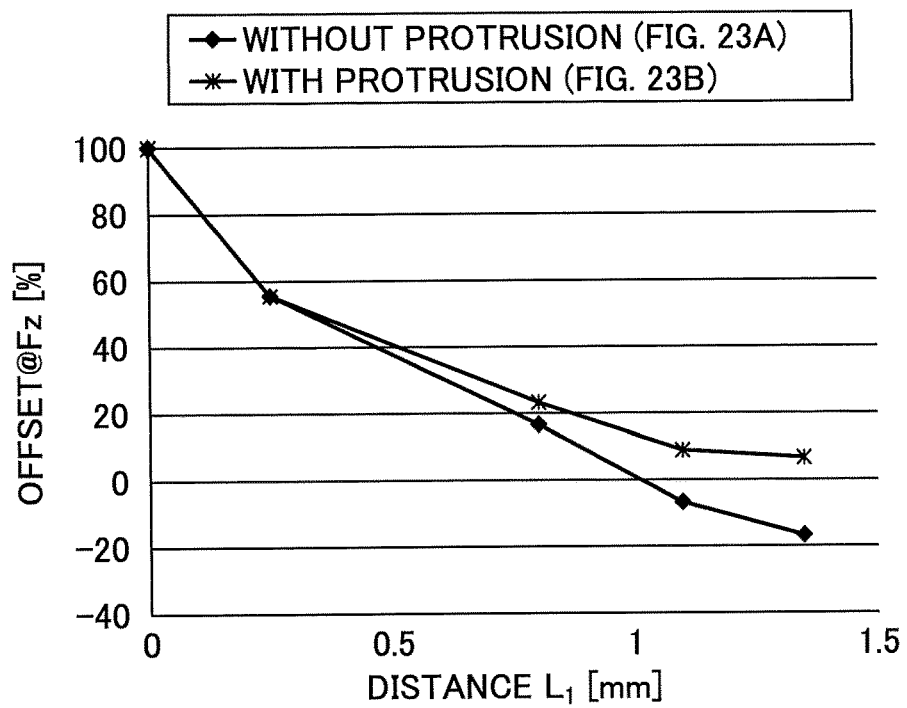
FIG. 24 is a graph illustrating simulation results of Fz outputs (offsets) of a sensor chip in models illustrated by FIGS. 23A and 23B.

FIG. 24 is a graph illustrating simulation results of Fz outputs (offsets) of the sensor chip 110 in the models illustrated by FIGS. 23A and 23B. As illustrated in FIG. 24, with the model of FIG. 23A that does not include the protrusion 28z, a negative offset is generated when the distance $L_1$ becomes greater than about 1 mm. In contrast, with the model of FIG. 23B including the protrusion 28z, no negative offset is generated even when the distance $L_1$ becomes greater than about 1 mm.

Figure 25:
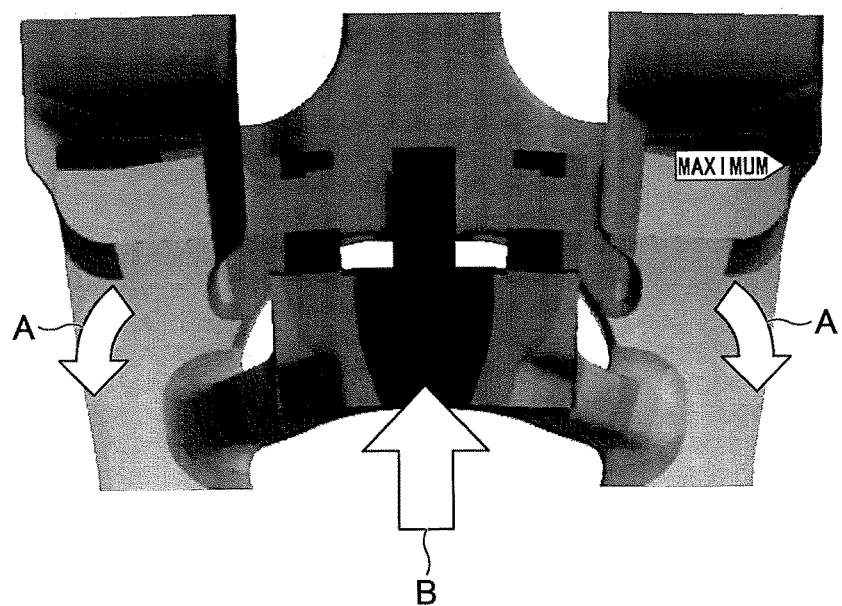
FIG. 25 is a drawing used to describe the results illustrated in FIG. 24.

As illustrated in FIG. 25, when the distance $L_1$ becomes greater than a predetermined value (e.g., 1 mm) in the model not including the protrusion 28z, upper portions of the columns 22a through 22d are pulled outward as indicated by arrows A, and the column 28 is pushed upward as indicated by an arrow B. It is supposed that this is the cause of the result indicated in FIG. 24. In contrast, with the model including the protrusion 28z, the protrusion 28z prevents the column 28 from being pushed or curved upward (in the direction indicated by the arrow B), and it is supposed that this is the cause of the result indicated in FIG. 24.

Thus, it has been confirmed that the generation of a negative offset in an Fz output of the sensor chip 110 as a result of increasing the distance $L_1$ can be prevented by providing the protrusion 28z that protrudes downward to a position lower than the lower surfaces of the connecting beams 28a through 28d.

Also, rounding the joints between the lower surfaces of the connecting beams 28a through 28d and the protrusion 28z makes it possible to alleviate the stress concentration at the joints and thereby improve the strength of the joints against the external force.

<Simulation 3>

Figure 26:
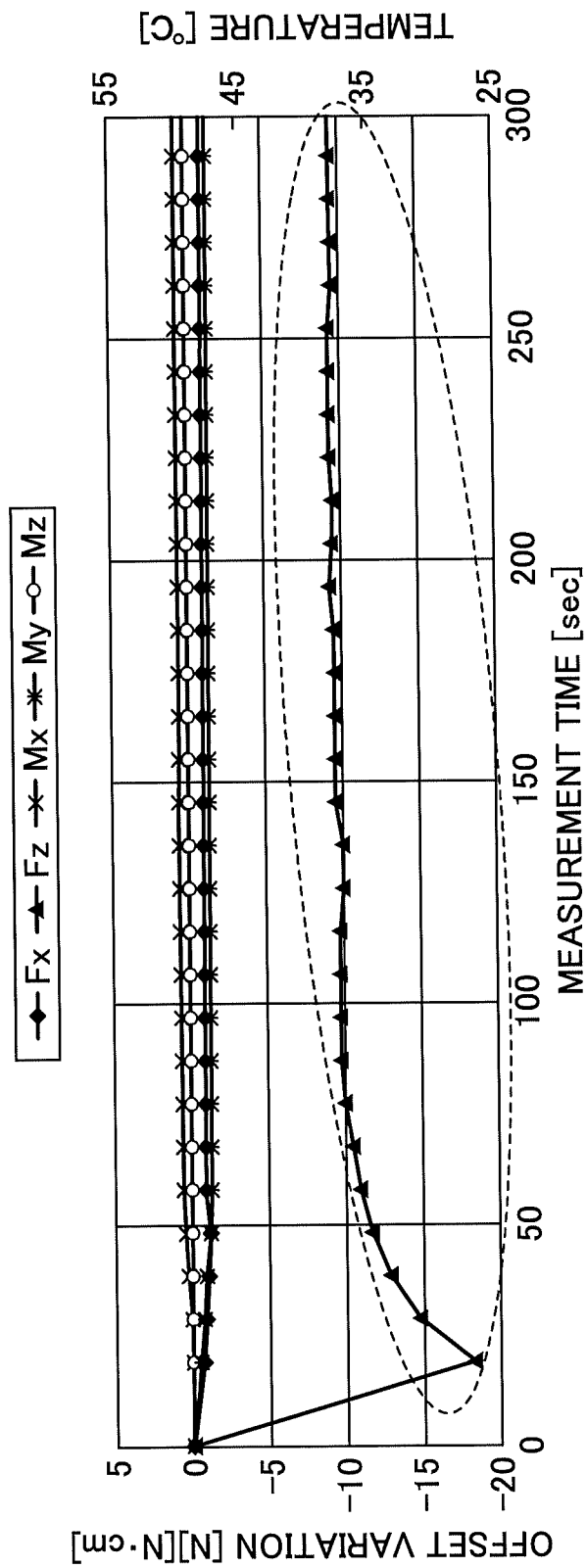
FIG. 26 is a graph illustrating temperature tracking characteristics of sensor chip outputs.

In a simulation 3, the temperature characteristics of offsets in sensor chip outputs are dynamically evaluated. FIG. 26 is a graph illustrating temperature tracking characteristics of sensor chip outputs that are evaluated by placing a force sensor on a surface of a peltiert device at about 50° C. As indicated by an area in FIG. 26 surrounded by a dotted line, it has been found out that a peculiar output variation (offset temperature drift) occurs only for the Fz axis among the six axes. The force sensor used for the evaluation of FIG. 26 includes the strain body of the comparative example illustrated by FIG. 18B.

Figure 27:
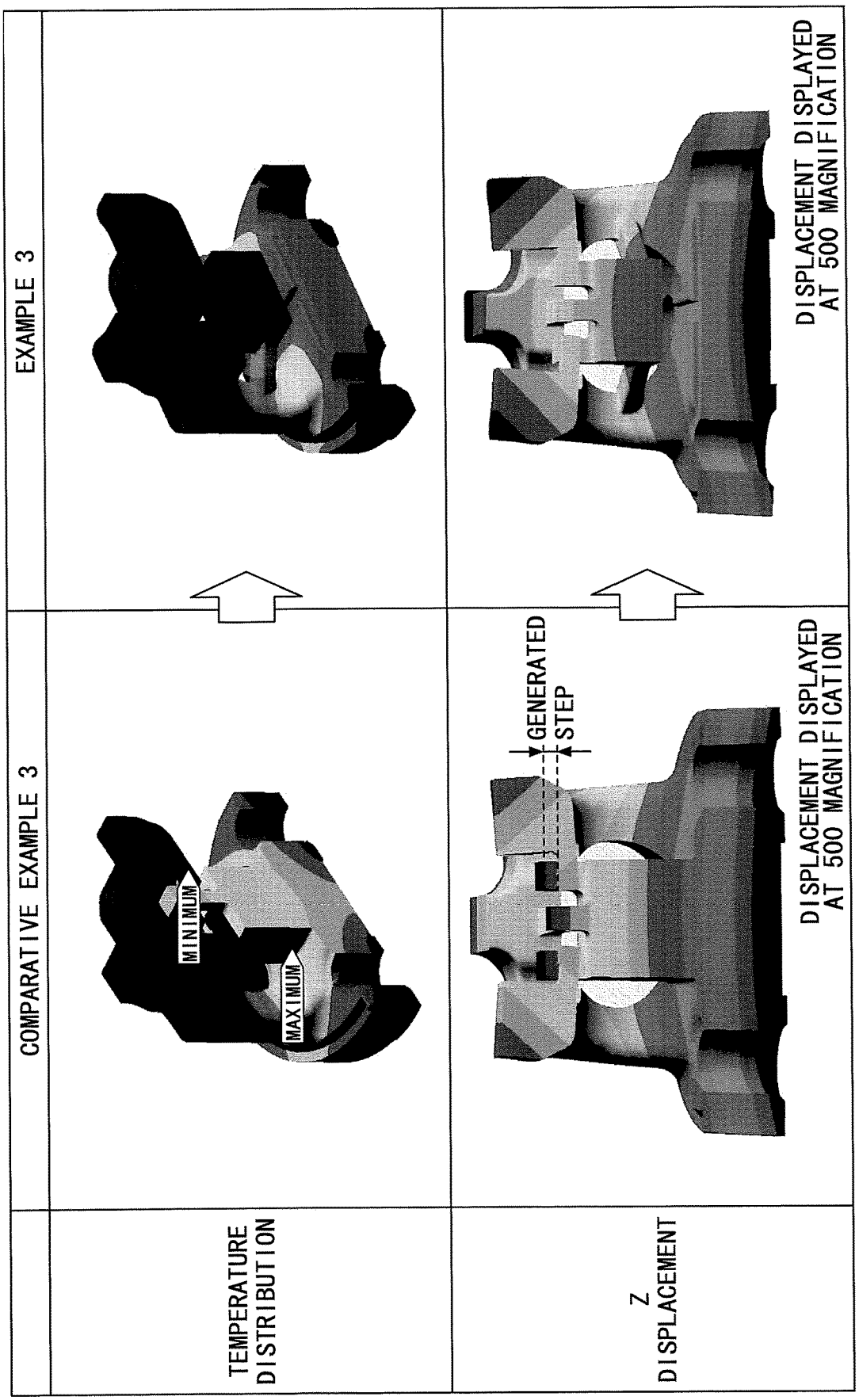
FIG. 27 is a drawing illustrating analysis results of Fz offset temperature drifts.

FIG. 27 illustrates analysis results of Fz offset temperature drifts. More particularly, FIG. 27 illustrates temperature distributions and displacements (at 500 magnification) of strain bodies of a comparative example 3 and an example 3 after one second from the time when heat is applied to change the temperature of the strain bodies to 25° C. to 55° C. The strain body of the comparative example 3 is the same as the strain body of the comparative example illustrated by FIG. 18B, and the strain body of the example 3 is the same as the strain body of the example 1 illustrated by FIG. 18C.

As illustrated in FIG. 27, in the comparative example 3, the difference in the Z-axis displacement between the upper surfaces of the columns 25a through 25d and the upper surfaces of the protrusions 27a through 27d illustrated in FIGS. 10A and 10B is large, and steps of about 0.6 μm are formed. In contrast, in the example 3, the difference in the Z-axis displacement between the upper surfaces of the columns 25a through 25d and the upper surfaces of the protrusions 27a through 27d illustrated in FIGS. 10A and 10B is small, and the height of steps is about 0.13 μm. In the comparative example 3, the formation of the large steps is considered to be a cause of the Fz-axis offset temperature drift. In this is true, it is expected that the Fz-axis offset temperature drift is reduced in the example 3. This is examined as described below.

Figure 28:
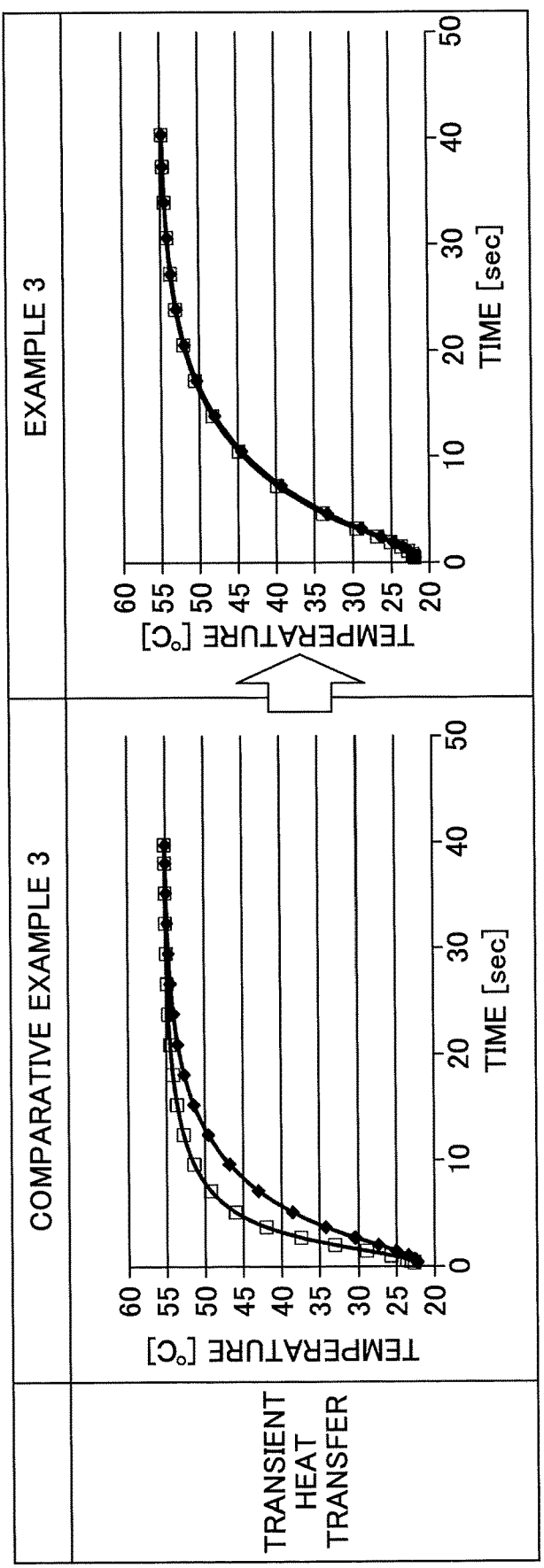
FIG. 28 is a drawing illustrating analysis results of Fz offset temperature drifts.

FIG. 28 illustrates analysis results of Fz offset temperature drifts. More particularly, FIG. 28 illustrates analysis results of transient heat transfer of the strain bodies of the comparative example 3 and the example 3 from the time when heat is applied to the time after 40 seconds from the application of heat. The strain bodies of the comparative example 3 and the example 3 are as described above. In each of the comparative example 3 and the example 3, circles indicate an average temperature of the upper surfaces of the columns 25a through 25d illustrated in FIGS. 10A and 10B, and squares indicate an average temperature of the upper surfaces the protrusions 27a through 27d illustrated in FIGS. 10A and 10B. As illustrated in FIG. 28, in the comparative example 3, the average temperature of the upper surfaces of the columns 25a through 25d and the average temperature of the upper surfaces of the protrusions 27a through 27d are different from each other for about 30 seconds after heat is applied. In contrast, in the example 3, the average temperature of the upper surfaces of the columns 25a through 25d and the average temperature of the upper surfaces of the protrusions 27a through 27d are substantially the same.

Figure 29:
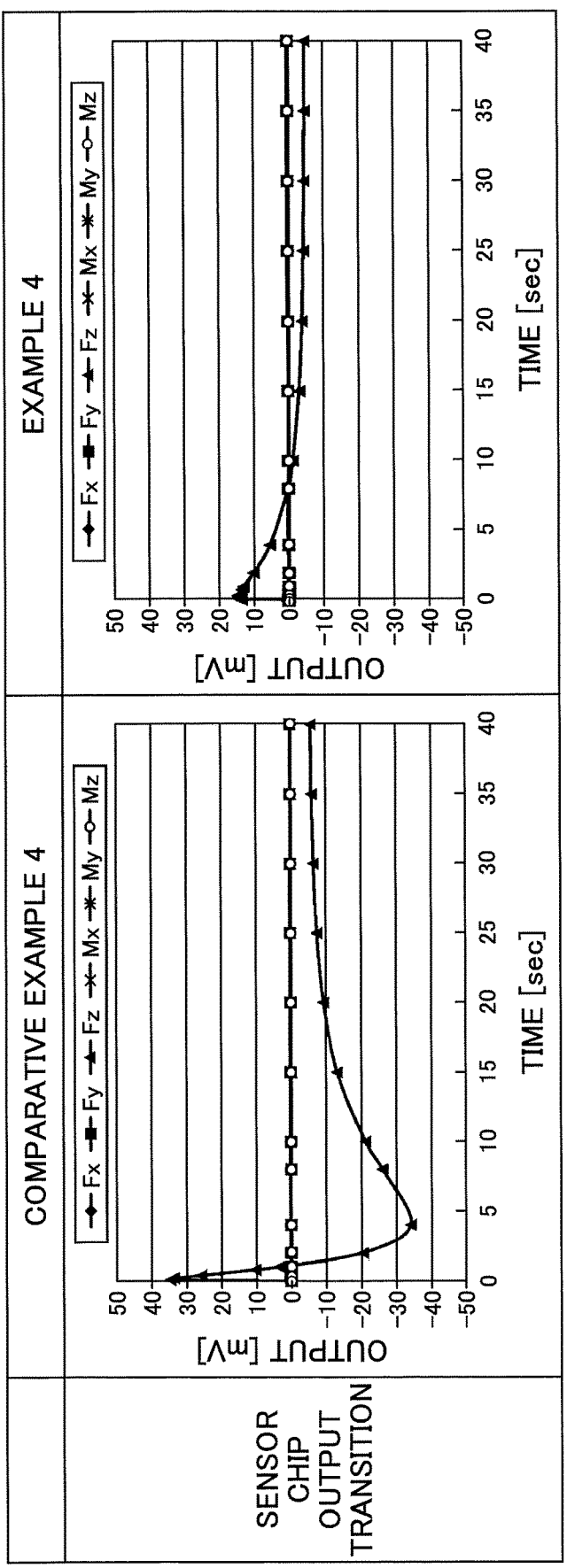
FIG. 29 is a drawing illustrating analysis results of Fz offset temperature drifts.

FIG. 29 illustrates analysis results of Fz offset temperature drifts. More particularly, FIG. 29 illustrates the transition of the sensor output estimated for each of a model (comparative example 4) where a sensor chip is mounted on the strain body of the comparative example 3 and a model (example 4) where a sensor chip is mounted on the strain body of the example 3. Heat is applied to the lower surface of the base 21.

As illustrated in FIG. 29, in both of the comparative example 4 and the example 4, almost no offset is generated in outputs other than the Fz output. Regarding the Fz output, in the comparative example 4, there is a large offset temperature drift during a period between the time when heat is applied to the time after 30 seconds from the application of heat. In contrast, in the example 4, the offset temperature drift is greatly reduced.

As described above, based on the results of simulation analysis on the peculiar behavior of the Fz output observed in the dynamic evaluation results of offset temperature characteristics, it has been confirmed that the Fz output varies due to displacement of the strain body resulting from transient temperature distribution of the strain body.

That is, the peculiar behavior of the Fz output is mainly caused by the configuration of the strain body. With the configuration of the comparative example 4 where the upper surface of the base 21 and the lower surface of the column 28 are directly connected to each other, during a period of about 30 seconds from the application of heat illustrated in FIG. 28, the time necessary for the heat to transfer from the lower surface of the base 21 to the upper surfaces of the columns 25a through 25d is different from the time necessary for the heat to transfer from the lower surface of the base 21 to the upper surfaces of the protrusions 27a through 27d. This results in formation of large steps between the upper surfaces of the columns 25a through 25d and the upper surfaces of the protrusions 27a through 27d (see FIG. 27), and causes an Fz offset temperature drift as illustrated in FIG. 29.

In contrast, with the configuration of the example 4 where the upper surface of the base 21 and the lower surface of the column 28 are separated from each other by a predetermined distance, as illustrated in FIG. 28, the time necessary for the heat to transfer from the lower surface of the base 21 to the upper surfaces of the columns 25a through 25d is substantially the same as the time necessary for the heat to transfer from the lower surface of the base 21 to the upper surfaces of the protrusions 27a through 27d. For this reason, steps between the upper surfaces of the columns 25a through 25d and the upper surfaces of the protrusions 27a through 27d are reduced, and the Fz offset temperature drift is reduced as illustrated in FIG. 29.

An aspect of this disclosure makes it possible to reduce a variation in a sensor chip output that is caused by a stress generated when a force sensor is attached to an object.

Force sensors according to embodiments of the present invention are described above. However, the present invention is not limited to the specifically disclosed embodiments, and variations and modifications may be made without departing from the scope of the present invention.

What is claimed is:

1. A force sensor, comprising:
   a sensor chip that detects displacements in multiple axial directions; and
   a strain body that transfers force applied thereto to the sensor chip and includes
      a sensor chip mount on which the sensor chip is mounted,
      multiple columns disposed around and apart from the sensor chip mount, and
      connecting beams that are directly connected to the sensor chip mount and the columns and via which the sensor chip mount is fixed to the columns.

2. The force sensor as claimed in claim 1, wherein the connecting beams are narrower than the columns.

3. The force sensor as claimed in claim 1, wherein the connecting beams are connected to the columns at positions that are lower than centers of the columns in a height direction.

4. The force sensor as claimed in claim 1, wherein
   the strain body includes a base to be attached to an object;
   the columns are disposed on an upper surface of the base; and
   a space is formed between the upper surface of the base and a lower surface of the sensor chip mount.

5. The force sensor as claimed in claim 4, wherein
   a number of the columns is four;
   the columns are arranged on the upper surface of the base at an equal distance from a center of the base;
   a horizontal cross-sectional shape of a portion of the sensor chip mount connected to the connecting beams is a rectangle; and
   four corners of the rectangle and the columns facing the four corners are connected to each other via the connecting beams.

6. The force sensor as claimed in claim 5, wherein the strain body includes
   four first beams each of which deforms according to applied force and connects upper ends of an adjacent pair of the columns;

second beams that protrude horizontally inward from inner side surfaces of the first beams and transfer deformation of the columns and the first beams to the sensor chip; and four input parts that protrude upward from centers in a longitudinal direction of the first beams and receive applied force.

7. The force sensor as claimed in claim 6, wherein protrusions that protrude upward and contact the sensor chip are formed at ends of the second beams.

8. The force sensor as claimed in claim 1, wherein the sensor chip includes a substrate, first supports disposed at four corners of the substrate, a second support disposed in a center of the substrate, first detection beams connecting adjacent pairs of the first supports, second detection beams disposed between the first detection beams and the second support in parallel with the corresponding first detection beams, third detection beams each of which connects one of the first detection beams and one of the second detection beams that are disposed parallel to each other, force points that are disposed at intersections between the first detection beams and the third detection beams and to which force is applied, and strain detectors disposed at predetermined positions on the first detection beams and the second detection beams; and the sensor chip is configured such that a displacement in a Z-axis direction corresponding to a thickness direction of the substrate is detected based on deformation of the first detection beams or the second detection beams, and displacements in an X-axis direction and a Y-axis direction, which are orthogonal to the Z-axis direction, are detected based on deformation of the first detection beams.

9. The force sensor as claimed in claim 8, wherein the sensor chip further includes first reinforcing beams that are disposed outside of and parallel to the first detection beams, each of the first reinforcing beams connects an adjacent pair of the first supports to each other, and second reinforcing beams that connect the first supports and the second support to each other;

the second reinforcing beams are not parallel to the first reinforcing beams;

the first reinforcing beams and the second reinforcing beams are thicker than the first detection beams, the second detection beams, and the third detection beams; and each of the second detection beams connects ends of an adjacent pair of the second reinforcing beams that are closer to the second support.

10. The force sensor as claimed in claim 9, wherein the first detection beams, the second detection beams, and the third detection beams are disposed at an upper-end side in a thickness direction of the first supports and the second support;

lower surfaces of the first supports, a lower surface of the second support, and lower surfaces of the force points are in a same plane at a lower-end side in the thickness direction of the first supports and the second supports; and at the lower-end side, lower surfaces of the first reinforcing beams and lower surfaces of the second reinforcing beams are positioned higher than the lower surfaces of the first supports, the lower surface of the second support, and the lower surfaces of the force points.

11. A force sensor as claimed in claim 1, comprising:

a sensor chip that detects displacements in multiple axial directions; and a strain body that transfers force applied thereto to the sensor chip and includes a sensor chip mount on which the sensor chip is mounted, multiple columns disposed around and apart from the sensor chip mount, and connecting beams via which the sensor chip mount is fixed to the columns, wherein the strain body further includes a protrusion that protrudes downward from a lower surface of the sensor chip mount to a position lower than lower surfaces of the connecting beams.

12. The force sensor as claimed in claim 11, wherein joints between the connecting beams and the protrusion are rounded.

* * * * *